United States Patent
Poddar

(10) Patent No.: US 9,589,312 B2
(45) Date of Patent: Mar. 7, 2017

(54) EXPLOITING FRAME-TO-FRAME COHERENCE FOR OPTIMIZING COLOR BUFFER CLEAR PERFORMANCE IN GRAPHICS PROCESSING UNITS

(71) Applicant: INTEL CORPORATION, Santa Clara, CA (US)

(72) Inventor: Bimal Poddar, El Dorado Hills, CA (US)

(73) Assignee: Intel Corporation, Santa Clara, CA (US)

(*) Notice: Subject to any disclaimer, the term of this patent is extended or adjusted under 35 U.S.C. 154(b) by 71 days.

(21) Appl. No.: 14/577,922

(22) Filed: Dec. 19, 2014

(65) Prior Publication Data

US 2016/0180488 A1 Jun. 23, 2016

(51) Int. Cl.
  *G06T 1/00* (2006.01)
  *G06T 15/00* (2011.01)
  *G06T 1/20* (2006.01)

(52) U.S. Cl.
  CPC ............ *G06T 1/20* (2013.01); *G06T 2200/28* (2013.01)

(58) Field of Classification Search
  None
  See application file for complete search history.

(56) References Cited

U.S. PATENT DOCUMENTS

| | | | |
|---|---|---|---|
| 5,748,864 A * | 5/1998 | Martin | G09G 5/393 345/422 |
| 6,288,722 B1 * | 9/2001 | Narayanaswami | G06T 1/60 345/473 |
| 6,337,690 B1 * | 1/2002 | Ashburn | G09G 5/393 345/531 |
| 2002/0047846 A1 * | 4/2002 | Lindholm | G06T 11/40 345/522 |

* cited by examiner

*Primary Examiner* — Barry Drennan
*Assistant Examiner* — Khoa Vu
(74) *Attorney, Agent, or Firm* — Blakely, Sokoloff, Taylor & Zafman LLP

(57) ABSTRACT

A mechanism is described for dynamically optimizing color buffer clear performance in graphics processing units. A method of embodiments, as described herein, includes allocating and initializing a first set of control bits associated with a framebuffer in a graphics processing unit (GPU), and rendering a first frame, wherein the first set of control bits are associated with the first frame. The method may further include allocating a second set of control bits associated with a second frame, and rendering the second frame. The method may further include facilitating an expedited resolve operation of the second frame based on a frame-to-frame coherence associated with the first and second frames.

24 Claims, 18 Drawing Sheets

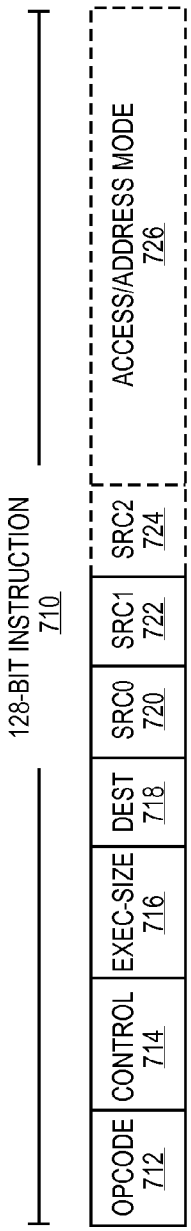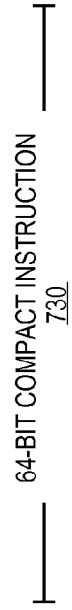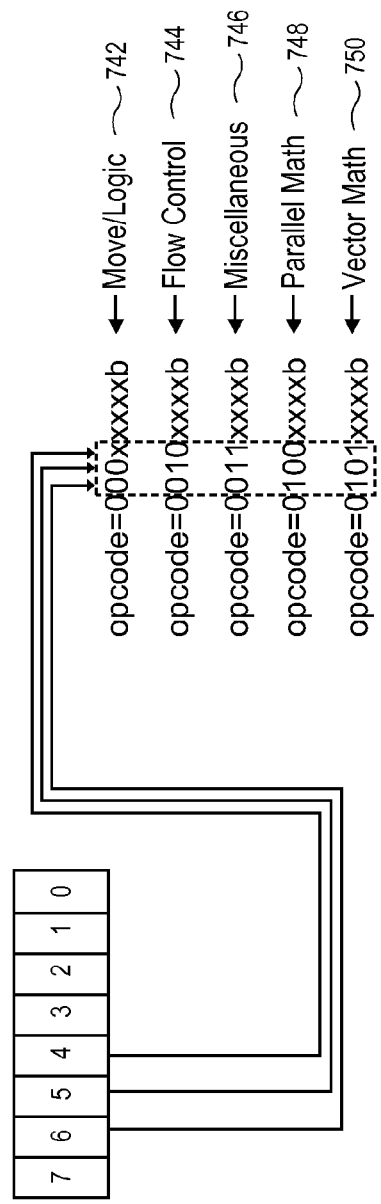
FIG. 7

FIG. 9A   SAMPLE COMMAND FORMAT
900

| CLIENT 902 | OPCODE 904 | SUB-OPCODE 905 | DATA 906 | COMMAND SIZE 908 |

FIG. 9B   SAMPLE COMMAND SEQUENCE
910

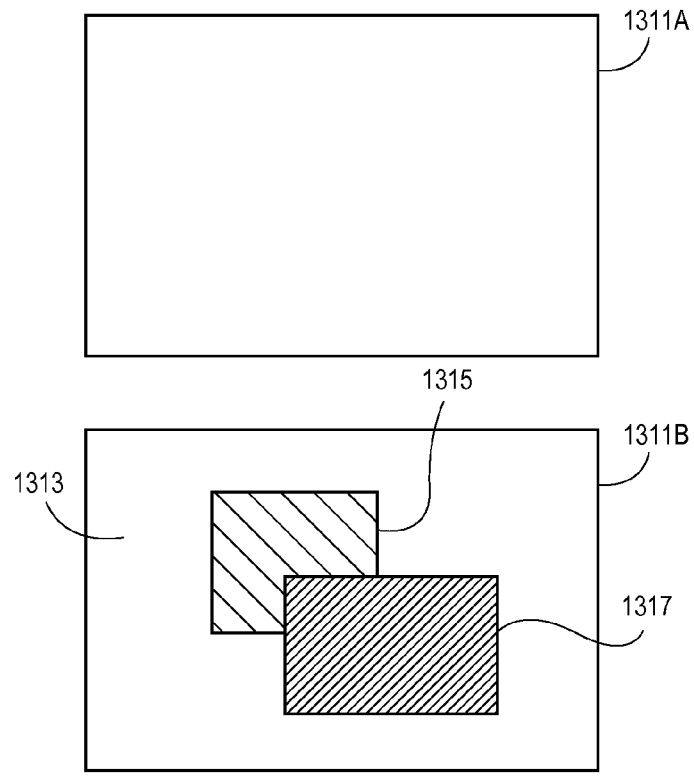
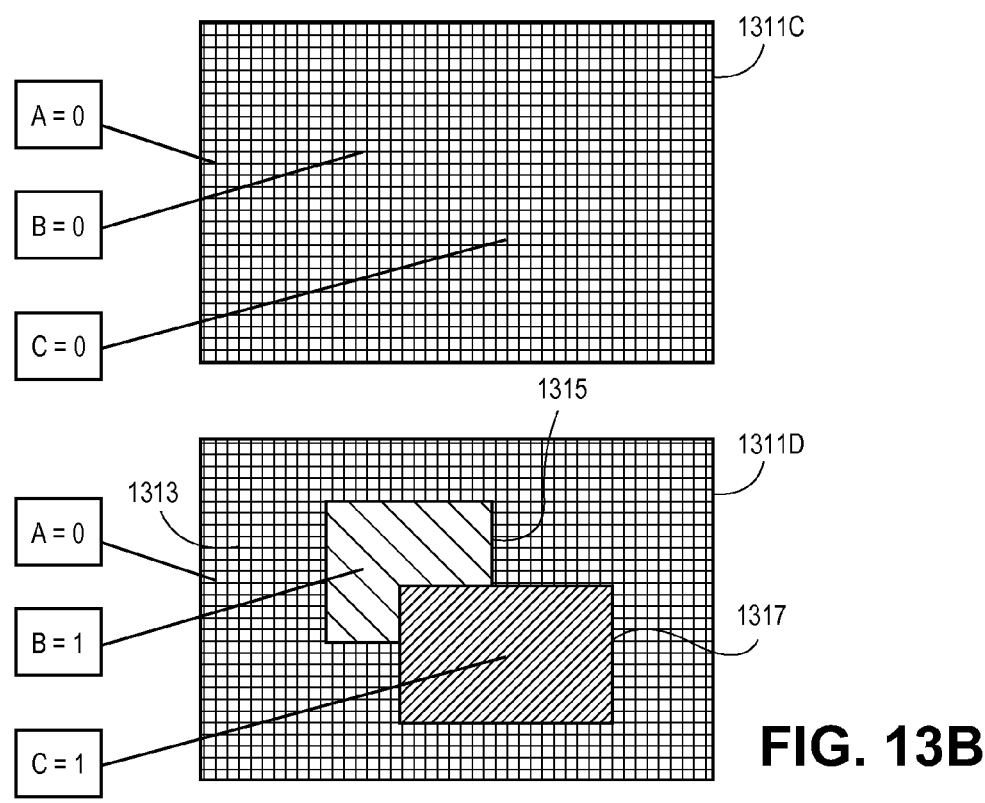
FIG. 13B

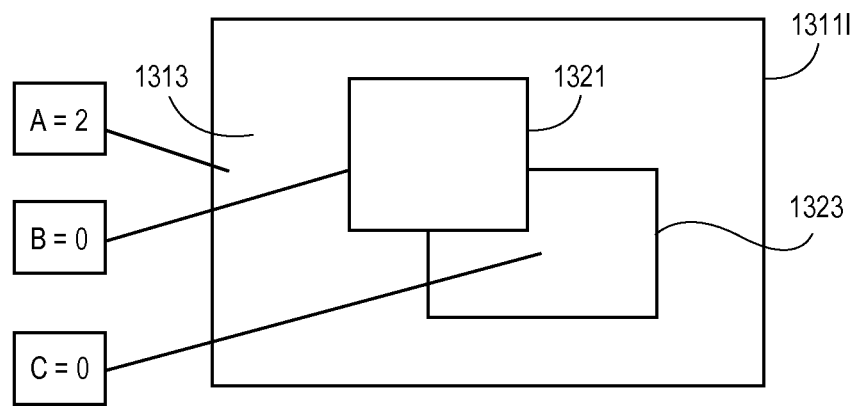
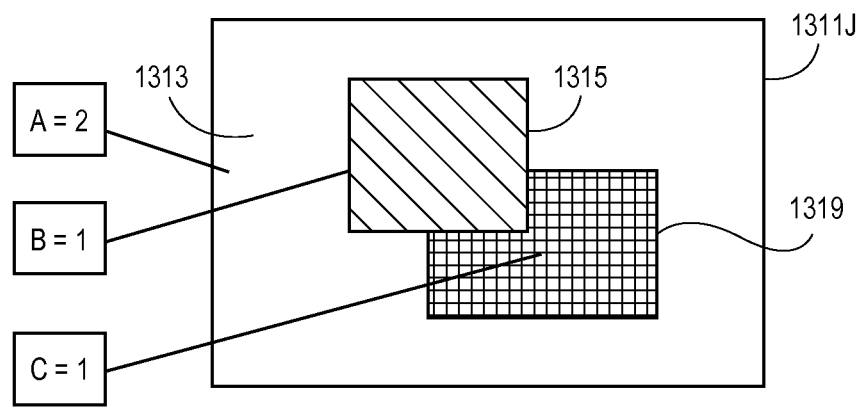
FIG. 13C

EXPLOITING FRAME-TO-FRAME COHERENCE FOR OPTIMIZING COLOR BUFFER CLEAR PERFORMANCE IN GRAPHICS PROCESSING UNITS

FIELD

Embodiments described herein generally relate to computers. More particularly, embodiments relate to a mechanism for exploiting frame-to-frame coherence for optimizing color buffer clear performance in graphics processing units.

BACKGROUND

Three-dimension (3D) graphics applications typically start a frame by clearing the framebuffer. The clear operation can be very time consuming and wasteful of system resource such as memory operations since the clear operation is expected to touch every pixel in the framebuffer. GPU implementations optimize the clear operation by delaying the activity of touching any pixel by tracking what pixels have been over-written and then performing the clear operation only on the pixels that were not touched during rendering. However, certain pixels which were cleared in a previous frame and have not been written to since they were cleared are cleared once more even with such delayed clear optimizations.

BRIEF DESCRIPTION OF THE DRAWINGS

Embodiments are illustrated by way of example, and not by way of limitation, in the figures of the accompanying drawings in which like reference numerals refer to similar elements.

FIG. 7 is a block diagram illustrating a graphics processor execution unit instruction format according to an embodiment.

FIG. 13C illustrates a hardware solution for optimizing color buffer clear performance in GPUs according to one embodiment.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for efficient performance of clear operations for fully and partially rendered current frames by, in one embodiment, leveraging any information from the previous frame for the current frame and exploiting the coherence in the two frames. This efficient performance of clear operations may significantly reduce the consumption of various system resources, such as time, bandwidth, power, etc. It is contemplated that power is an important consideration for computing devices, such as with regard to mobile computing devices, and embodiments provide for a technique for significantly reducing power consumption by minimizing the number of memory transactions for clears for various classes of applications. Conventional techniques are limited in their approach, such as the use of bounding boxes does not work with sparsely-rendered frames when, for example, the sparse content is spatially distributed in the framebuffer, where some applications may render in one corner of the screen which would expand the size of the bounding box used for tracking region that needs to be cleared in the next frame.

Figure 1:
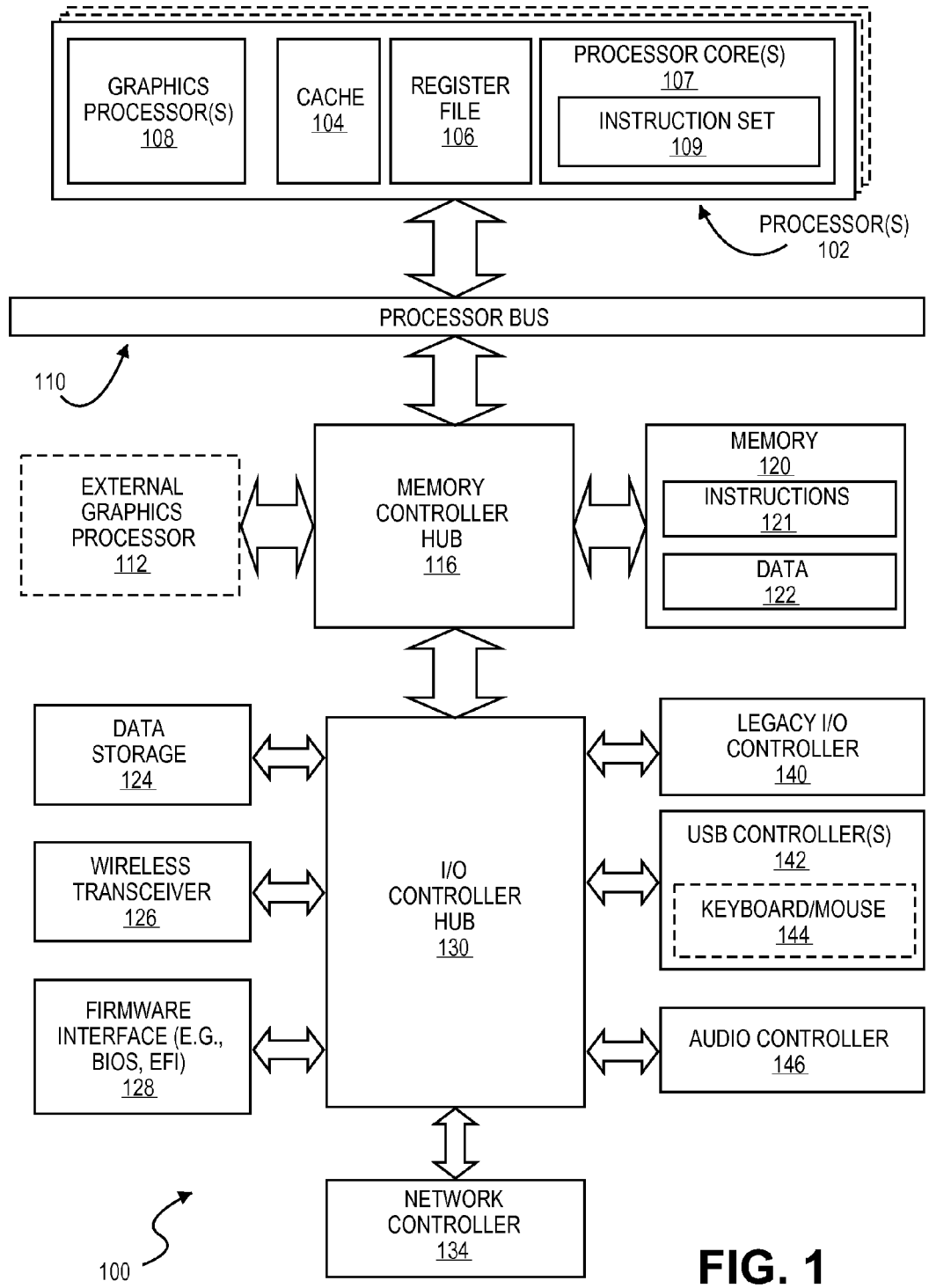
FIG. 1 is a block diagram of a data processing system, according to an embodiment.
Figure 2:
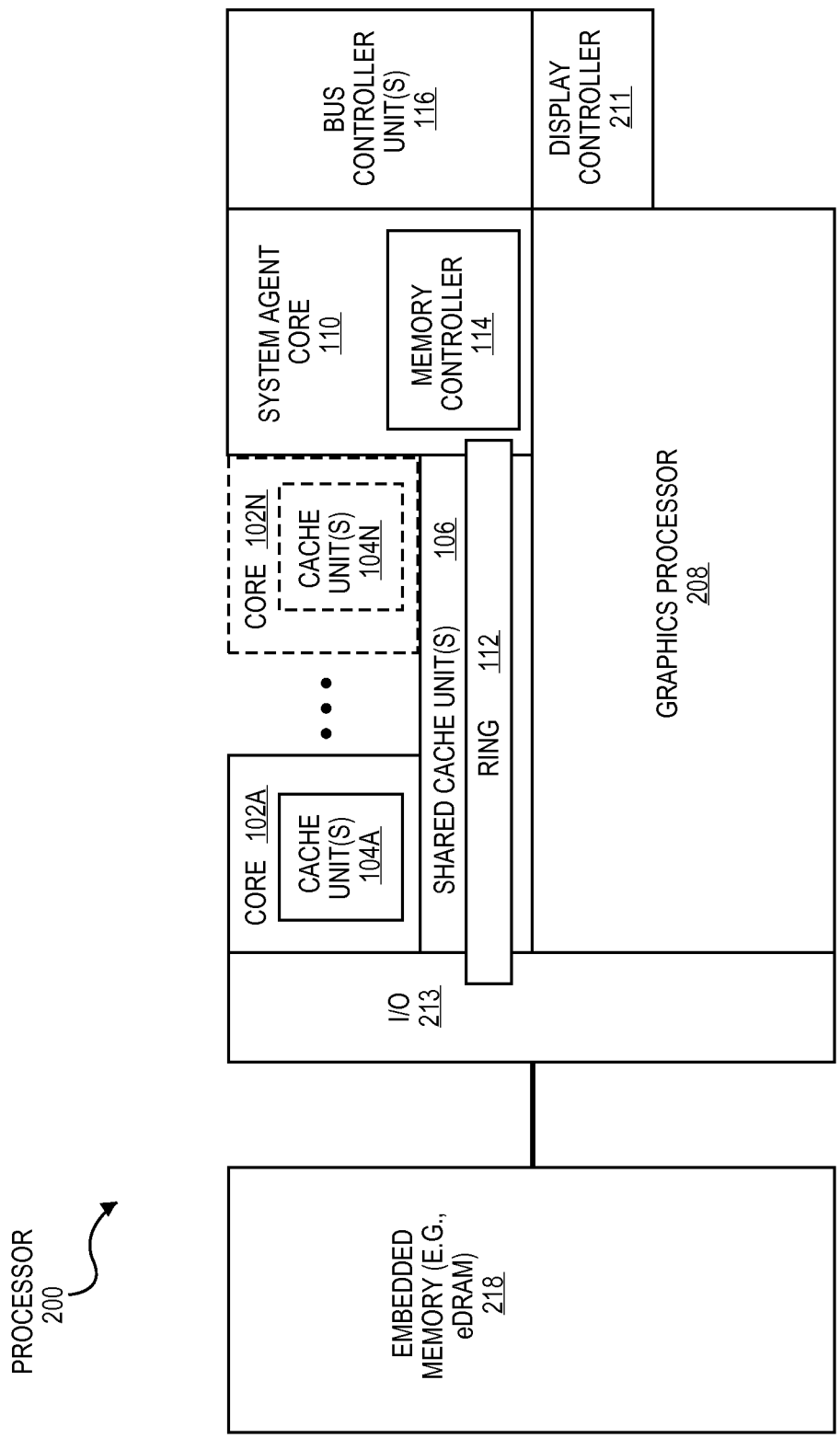
FIG. 2 is a block diagram of an embodiment of a processor having one or more processor cores, an integrated memory controller, and an integrated graphics processor.
Figure 3:
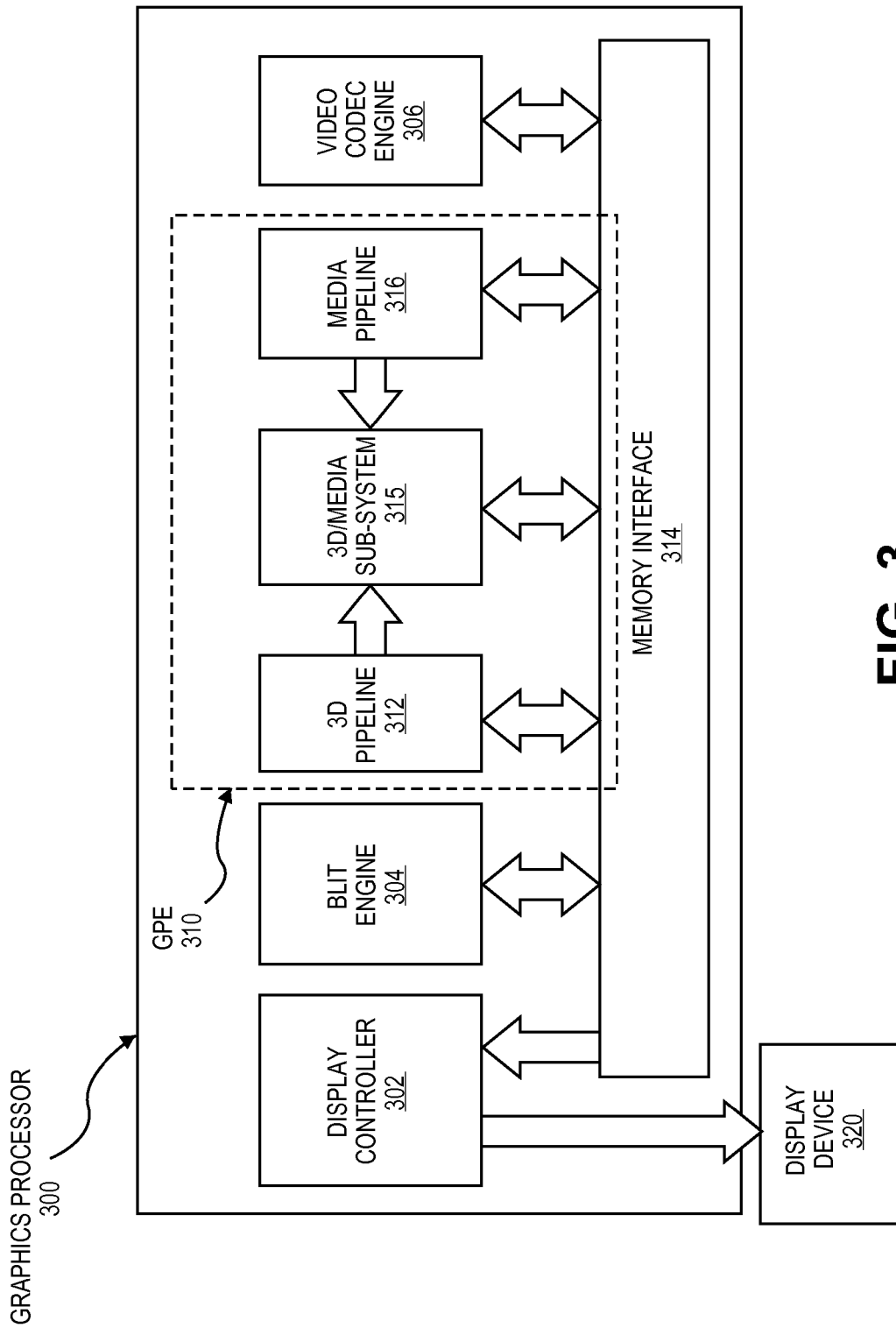
FIG. 3 is a block diagram of one embodiment of a graphics processor which may be a discreet graphics processing unit, or may be graphics processor integrated with a plurality of processing cores.

Overview—FIGS. 1-3

FIG. 1 is a block diagram of a data processing system 100, according to an embodiment. The data processing system 100 includes one or more processors 102 and one or more graphics processors 108, and may be a single processor desktop system, a multiprocessor workstation system, or a server system having a large number of processors 102 or processor cores 107. In on embodiment, the data processing system 100 is a system on a chip integrated circuit (SOC) for use in mobile, handheld, or embedded devices.

An embodiment of the data processing system 100 can include, or be incorporated within a server-based gaming platform, a game console, including a game and media console, a mobile gaming console, a handheld game console, or an online game console. In one embodiment, the data processing system 100 is a mobile phone, smart phone, tablet computing device or mobile Internet device. The data processing system 100 can also include, couple with, or be integrated within a wearable device, such as a smart watch wearable device, smart eyewear device, augmented reality device, or virtual reality device. In one embodiment, the data processing system 100 is a television or set top box device having one or more processors 102 and a graphical interface generated by one or more graphics processors 108.

The one or more processors 102 each include one or more processor cores 107 to process instructions which, when executed, perform operations for system and user software. In one embodiment, each of the one or more processor cores 107 is configured to process a specific instruction set 109. The instruction set 109 may facilitate complex instruction set computing (CISC), reduced instruction set computing (RISC), or computing via a very long instruction word (VLIW). Multiple processor cores 107 may each process a different instruction set 109 which may include instructions to facilitate the emulation of other instruction sets. A processor core 107 may also include other processing devices, such a digital signal processor (DSP).

In one embodiment, the processor 102 includes cache memory 104. Depending on the architecture, the processor 102 can have a single internal cache or multiple levels of internal cache. In one embodiment, the cache memory is shared among various components of the processor 102. In one embodiment, the processor 102 also uses an external cache (e.g., a Level 3 (L3) cache or last level cache (LLC)) (not shown) which may be shared among the processor cores 107 using known cache coherency techniques. A register file 106 is additionally included in the processor 102 which may include different types of registers for storing different types of data (e.g., integer registers, floating point registers, status registers, and an instruction pointer register). Some registers may be general-purpose registers, while other registers may be specific to the design of the processor 102.

The processor 102 is coupled to a processor bus 110 to transmit data signals between the processor 102 and other components in the system 100. The system 100 uses an exemplary 'hub' system architecture, including a memory controller hub 116 and an input output (I/O) controller hub 130. The memory controller hub 116 facilitates communication between a memory device and other components of the system 100, while the I/O controller hub (ICH) 130 provides connections to I/O devices via a local I/O bus.

The memory device 120 can be a dynamic random access memory (DRAM) device, a static random access memory (SRAM) device, flash memory device, or some other memory device having suitable performance to serve as process memory. The memory 120 can store data 122 and instructions 121 for use when the processor 102 executes a process. The memory controller hub 116 also couples with an optional external graphics processor 112, which may communicate with the one or more graphics processors 108 in the processors 102 to perform graphics and media operations.

The ICH 130 enables peripherals to connect to the memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to the ICH 130. In one embodiment, a high-performance network controller (not shown) couples to the processor bus 110.

FIG. 2 is a block diagram of an embodiment of a processor 200 having one or more processor cores 102A-N, an integrated memory controller 114, and an integrated graphics processor 208. The processor 200 can include additional cores up to and including additional core 102N represented by the dashed lined boxes. Each of the cores 102A-N includes one or more internal cache unit(s) 104A-N. In one embodiment each core also has access to one or more shared cached unit(s) 106.

The internal cache unit(s) 104A-N and shared cache units 106 represent a cache memory hierarchy within the processor 200. The cache memory hierarchy may include at least one level of instruction and data cache within each core and one or more levels of shared mid-level cache, such as a level 2 (L2), level 3 (L3), level 4 (L4), or other levels of cache, where the highest level of cache before external memory is classified as the last level cache (LLC). In one embodiment, cache coherency logic maintains coherency between the various cache units 106 and 104A-N.

The processor 200 may also include a set of one or more bus controller units 116 and a system agent 110. The one or more bus controller units manage a set of peripheral buses, such as one or more Peripheral Component Interconnect buses (e.g., PCI, PCI Express). The system agent 110 provides management functionality for the various processor components. In one embodiment, the system agent 110 includes one or more integrated memory controllers 114 to manage access to various external memory devices (not shown).

In one embodiment, one or more of the cores 102A-N include support for simultaneous multi-threading. In such embodiment, the system agent 110 includes components for coordinating and operating cores 102A-N during multi-threaded processing. The system agent 110 may additionally include a power control unit (PCU), which includes logic and components to regulate the power state of the cores 102A-N and the graphics processor 208.

The processor 200 additionally includes a graphics processor 208 to execute graphics processing operations. In one embodiment, the graphics processor 208 couples with the set of shared cache units 106, and the system agent unit 110, including the one or more integrated memory controllers 114. In one embodiment, a display controller 211 is coupled with the graphics processor 208 to drive graphics processor output to one or more coupled displays. The display controller 211 may be separate module coupled with the graphics processor via at least one interconnect, or may be integrated within the graphics processor 208 or system agent 110.

In one embodiment a ring based interconnect unit 112 is used to couple the internal components of the processor 200, however an alternative interconnect unit may be used, such as a point to point interconnect, a switched interconnect, or other techniques, including techniques well known in the art. In one embodiment, the graphics processor 208 couples with the ring interconnect 112 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In one embodiment each of the cores 102-N and the graphics processor 208 use the embedded memory modules 218 as shared last level cache.

In one embodiment cores 102A-N are homogenous cores executing the same instruction set architecture. In another embodiment, the cores 102A-N are heterogeneous in terms of instruction set architecture (ISA), where one or more of the cores 102A-N execute a first instruction set, while at least one of the other cores executes a subset of the first instruction set or a different instruction set.

The processor 200 can be a part of or implemented on one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, the processor 200 can be implemented on one or more chips or as a system on a chip (SOC) integrated circuit having the illustrated components, in addition to other components.

FIG. 3 is a block diagram of one embodiment of a graphics processor 300 which may be a discreet graphics processing unit, or may be graphics processor integrated with a plurality of processing cores. In one embodiment, the graphics processor is communicated with via a memory mapped I/O interface to registers on the graphics processor and via commands placed into the processor memory. The graphics processor 300 includes a memory interface 314 to access memory. The memory interface 314 can be an interface to local memory, one or more internal caches, one or more shared external caches, and/or to system memory.

The graphics processor 300 also includes a display controller 302 to drive display output data to a display device 320. The display controller 302 includes hardware for one or more overlay planes for the display and composition of multiple layers of video or user interface elements. In one embodiment the graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In one embodiment, the graphics processor 300 includes a block image transfer (BLIT) engine 304 to perform two-dimensional (2D) rasterizer operations including, for example, bit-boundary block transfers. However, in one embodiment, 2D graphics operations are performed using one or more components of the graphics-processing engine (GPE) 310. The graphics-processing engine 310 is a compute engine for performing graphics operations, including three-dimensional (3D) graphics operations and media operations.

The GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While the 3D pipeline 312 can be used to perform media operations, an embodiment of the GPE 310 also includes a media pipeline 316 that is specifically used to perform media operations, such as video post processing and image enhancement.

In one embodiment, the media pipeline 316 includes fixed function or programmable logic units to perform one or more specialized media operations, such as video decode acceleration, video de-interlacing, and video encode acceleration in place of, or on behalf of the video codec engine 306. In on embodiment, the media pipeline 316 additionally includes a thread spawning unit to spawn threads for execution on the 3D/Media sub-system 315. The spawned threads perform computations for the media operations on one or more graphics execution units included in the 3D/Media sub-system.

The 3D/Media subsystem 315 includes logic for executing threads spawned by the 3D pipeline 312 and media pipeline 316. In one embodiment, the pipelines send thread execution requests to the 3D/Media subsystem 315, which includes thread dispatch logic for arbitrating and dispatching the various requests to available thread execution resources. The execution resources include an array of graphics execution units to process the 3D and media threads. In one embodiment, the 3D/Media subsystem 315 includes one or more internal caches for thread instructions and data. In one embodiment, the subsystem also includes shared memory, including registers and addressable memory, to share data between threads and to store output data.

Figure 4:
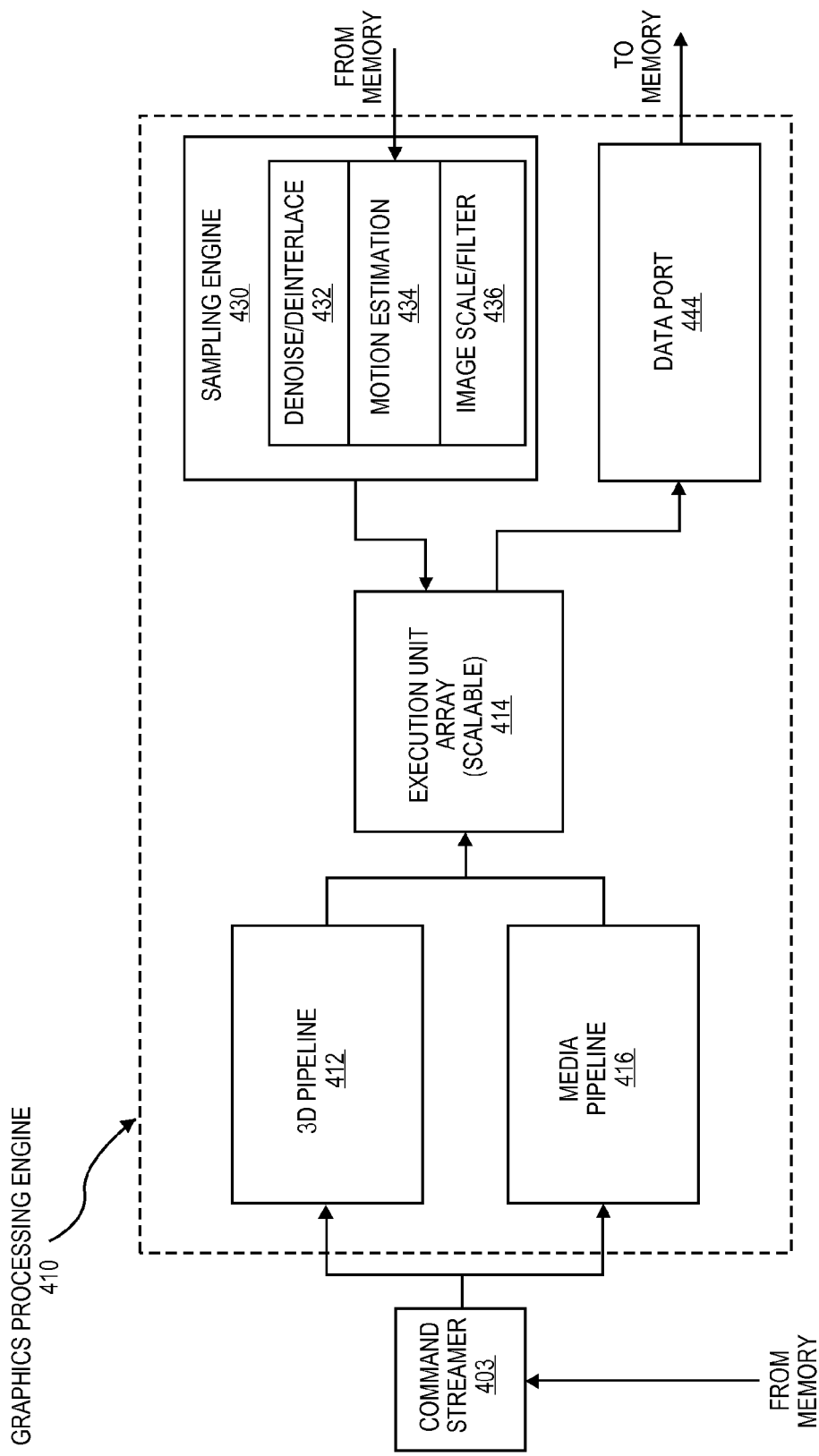
FIG. 4 is a block diagram of an embodiment of a graphics processing engine for a graphics processor.

3D/Media Processing—FIG. 4

FIG. 4 is a block diagram of an embodiment of a graphics processing engine 410 for a graphics processor. In one embodiment, the graphics processing engine (GPE) 410 is a version of the GPE 310 shown in FIG. 3. The GPE 410 includes a 3D pipeline 412 and a media pipeline 416, each of which can be either different from or similar to the implementations of the 3D pipeline 312 and the media pipeline 316 of FIG. 3.

In one embodiment, the GPE 410 couples with a command streamer 403, which provides a command stream to the GPE 3D and media pipelines 412, 416. The command streamer 403 is coupled to memory, which can be system memory, or one or more of internal cache memory and shared cache memory. The command streamer 403 receives commands from the memory and sends the commands to the 3D pipeline 412 and/or media pipeline 416. The 3D and media pipelines process the commands by performing operations via logic within the respective pipelines or by dispatching one or more execution threads to the execution unit array 414. In one embodiment, the execution unit array 414 is scalable, such that the array includes a variable number of execution units based on the target power and performance level of the GPE 410.

A sampling engine 430 couples with memory (e.g., cache memory or system memory) and the execution unit array 414. In one embodiment, the sampling engine 430 provides a memory access mechanism for the scalable execution unit array 414 that allows the execution array 414 to read graphics and media data from memory. In one embodiment, the sampling engine 430 includes logic to perform specialized image sampling operations for media.

The specialized media sampling logic in the sampling engine 430 includes a de-noise/de-interlace module 432, a motion estimation module 434, and an image scaling and filtering module 436. The de-noise/de-interlace module 432 includes logic to perform one or more of a de-noise or a de-interlace algorithm on decoded video data. The de-interlace logic combines alternating fields of interlaced video content into a single fame of video. The de-noise logic reduces or remove data noise from video and image data. In one embodiment, the de-noise logic and de-interlace logic are motion adaptive and use spatial or temporal filtering based on the amount of motion detected in the video data. In one embodiment, the de-noise/de-interlace module 432 includes dedicated motion detection logic (e.g., within the motion estimation engine 434).

The motion estimation engine 434 provides hardware acceleration for video operations by performing video acceleration functions such as motion vector estimation and prediction on video data. The motion estimation engine determines motion vectors that describe the transformation of image data between successive video frames. In one embodiment, a graphics processor media codec uses the video motion estimation engine 434 to perform operations on video at the macro-block level that may otherwise be computationally intensive to perform using a general-purpose processor. In one embodiment, the motion estimation engine 434 is generally available to graphics processor components to assist with video decode and processing functions that are sensitive or adaptive to the direction or magnitude of the motion within video data.

The image scaling and filtering module 436 performs image-processing operations to enhance the visual quality of generated images and video. In one embodiment, the scaling and filtering module 436 processes image and video data during the sampling operation before providing the data to the execution unit array 414.

In one embodiment, the graphics processing engine 410 includes a data port 444, which provides an additional mechanism for graphics subsystems to access memory. The data port 444 facilitates memory access for operations including render target writes, constant buffer reads, scratch memory space reads/writes, and media surface accesses. In one embodiment, the data port 444 includes cache memory space to cache accesses to memory. The cache memory can be a single data cache or separated into multiple caches for the multiple subsystems that access memory via the data port (e.g., a render buffer cache, a constant buffer cache, etc.). In one embodiment, threads executing on an execution unit in the execution unit array 414 communicate with the data port by exchanging messages via a data distribution interconnect that couples each of the sub-systems of the graphics processing engine 410.

Figure 5:
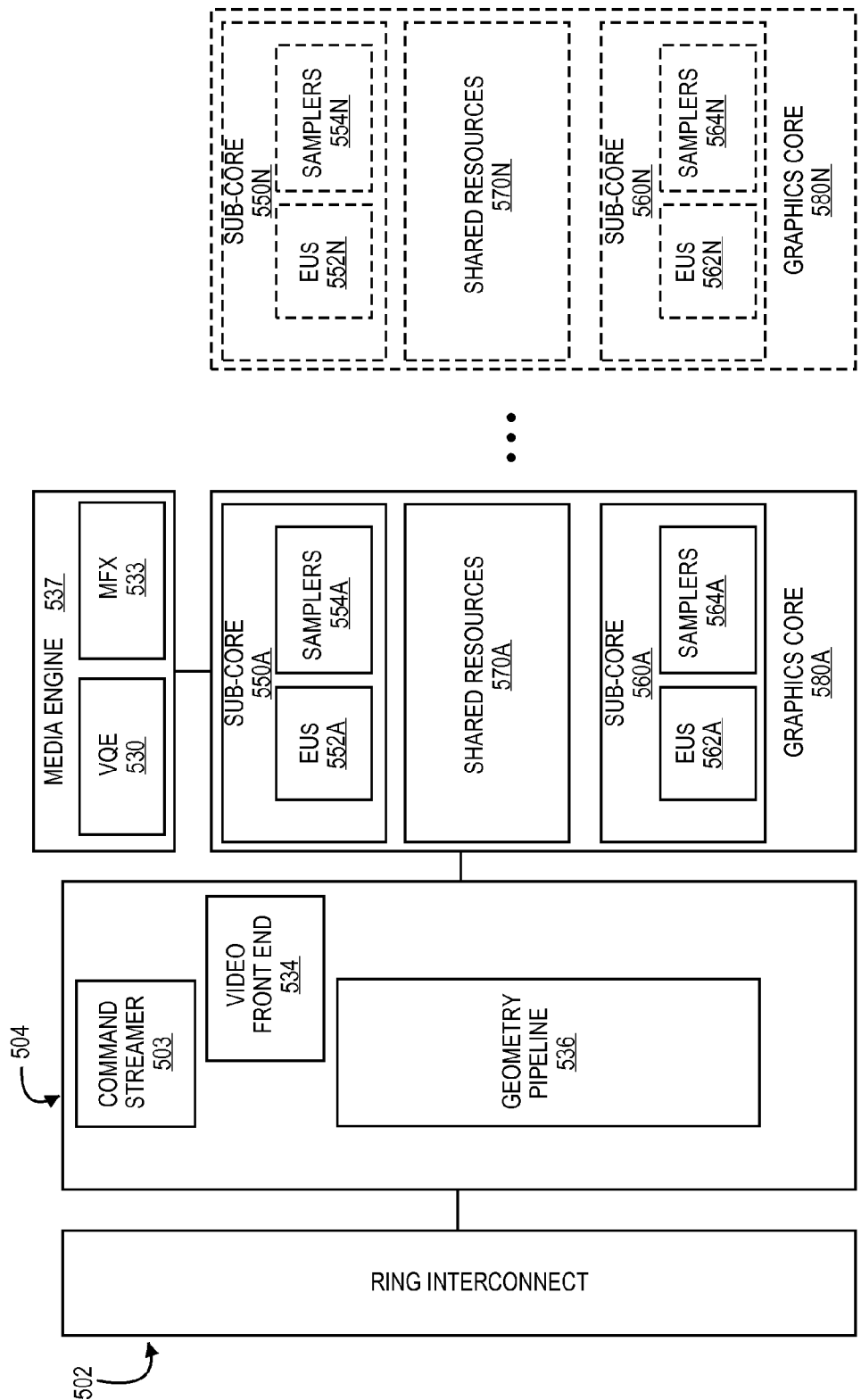
FIG. 5 is a block diagram of another embodiment of a graphics processor.
Figure 6:
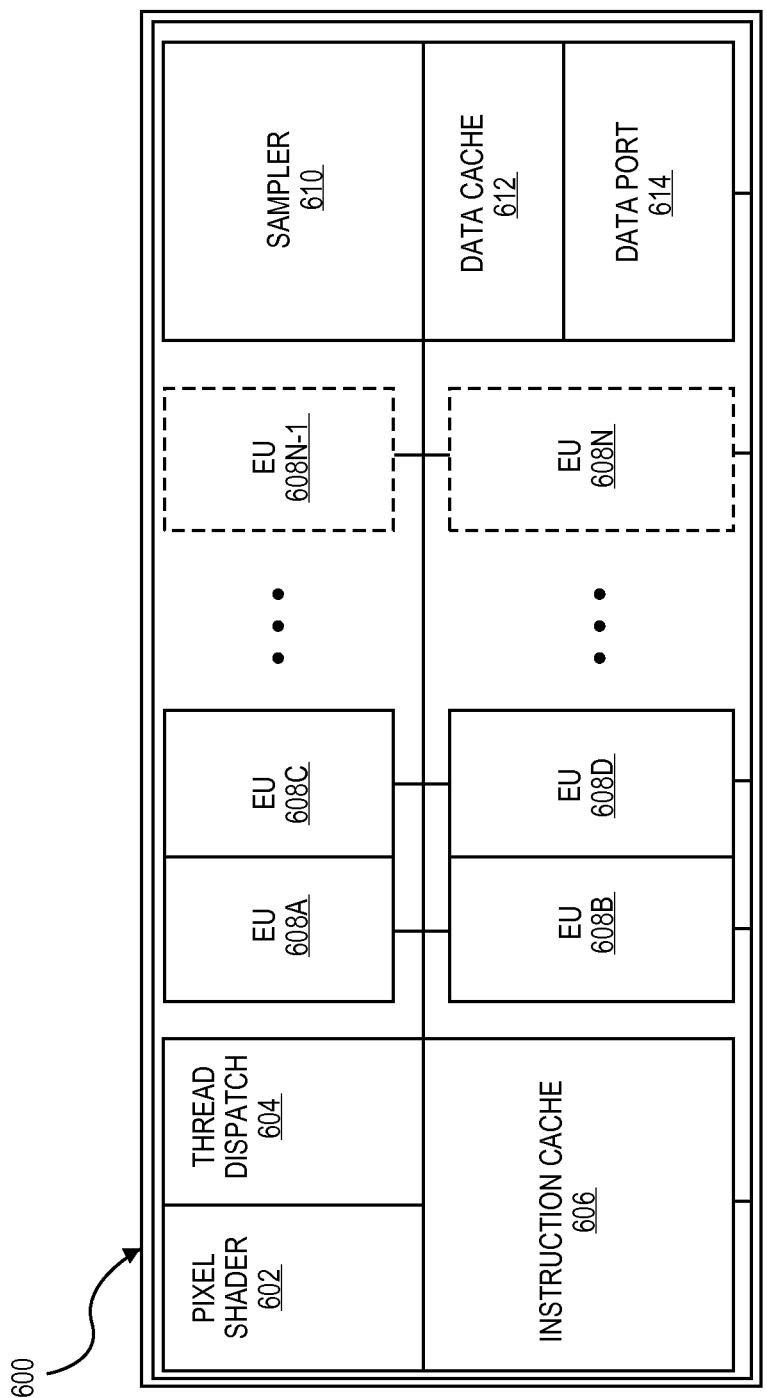
FIG. 6 illustrates thread execution logic including an array of processing elements employed in one embodiment of a graphics processing engine.

Execution Units—FIGS. 5-7

FIG. 5 is a block diagram of another embodiment of a graphics processor. In one embodiment, the graphics processor includes a ring interconnect 502, a pipeline front-end 504, a media engine 537, and graphics cores 580A-N. The ring interconnect 502 couples the graphics processor to other processing units, including other graphics processors or one or more general-purpose processor cores. In one embodiment, the graphics processor is one of many processors integrated within a multi-core processing system.

The graphics processor receives batches of commands via the ring interconnect 502. The incoming commands are interpreted by a command streamer 503 in the pipeline front-end 504. The graphics processor includes scalable execution logic to perform 3D geometry processing and media processing via the graphics core(s) 580A-N. For 3D geometry processing commands, the command streamer 503 supplies the commands to the geometry pipeline 536. For at least some media processing commands, the command streamer 503 supplies the commands to a video front end 534, which couples with a media engine 537. The media engine 537 includes a video quality engine (VQE) 530 for video and image post processing and a multi-format encode/decode (MFX) 533 engine to provide hardware-accelerated media data encode and decode. The geometry pipeline 536 and media engine 537 each generate execution threads for the thread execution resources provided by at least one graphics core 580A.

The graphics processor includes scalable thread execution resources featuring modular cores 580A-N (sometime referred to as core slices), each having multiple sub-cores 550A-N, 560A-N (sometimes referred to as core sub-slices). The graphics processor can have any number of graphics cores 580A through 580N. In one embodiment, the graphics processor includes a graphics core 580A having at least a first sub-core 550A and a second core sub-core 560A. In another embodiment, the graphics processor is a low power processor with a single sub-core (e.g., 550A). In one embodiment, the graphics processor includes multiple graphics cores 580A-N, each including a set of first sub-cores 550A-N and a set of second sub-cores 560A-N. Each sub-core in the set of first sub-cores 550A-N includes at least a first set of execution units 552A-N and media/texture samplers 554A-N. Each sub-core in the set of second sub-cores 560A-N includes at least a second set of execution units 562A-N and samplers 564A-N. In one embodiment, each sub-core 550A-N, 560A-N shares a set of shared resources 570A-N. In one embodiment, the shared resources include shared cache memory and pixel operation logic. Other shared resources may also be included in the various embodiments of the graphics processor.

FIG. 6 illustrates thread execution logic 600 including an array of processing elements employed in one embodiment of a graphics processing engine. In one embodiment, the thread execution logic 600 includes a pixel shader 602, a thread dispatcher 604, instruction cache 606, a scalable execution unit array including a plurality of execution units 608A-N, a sampler 610, a data cache 612, and a data port 614. In one embodiment the included components are interconnected via an interconnect fabric that links to each of the components. The thread execution logic 600 includes one or more connections to memory, such as system memory or cache memory, through one or more of the instruction cache 606, the data port 614, the sampler 610, and the execution unit array 608A-N. In one embodiment, each execution unit (e.g. 608A) is an individual vector processor capable of executing multiple simultaneous threads and processing multiple data elements in parallel for each thread. The execution unit array 608A-N includes any number individual execution units.

In one embodiment, the execution unit array 608A-N is primarily used to execute "shader" programs. In one embodiment, the execution units in the array 608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in the execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical ALUs or FPUs for a particular graphics processor. The execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (quadword (QW) size data elements), eight separate 32-bit packed data elements (double word (DW) size data elements), sixteen separate 16-bit packed data elements (word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In one embodiment, one or more data caches (e.g., 612) are included to cache thread data during thread execution. A sampler 610 is included to provide texture sampling for 3D operations and media sampling for media operations. In one embodiment, the sampler 610 includes specialized texture or media sampling functionality to process texture or media data during the sampling process before providing the sampled data to an execution unit.

During execution, the graphics and media pipelines send thread initiation requests to the thread execution logic 600 via thread spawning and dispatch logic. The thread execution logic 600 includes a local thread dispatcher 604 that arbitrates thread initiation requests from the graphics and media pipelines and instantiates the requested threads on one or more execution units 608A-N. For example, the geometry pipeline (e.g., 536 of FIG. 5) dispatches vertex processing, tessellation, or geometry processing threads to the thread execution logic 600. The thread dispatcher 604 can also process runtime thread spawning requests from the executing shader programs.

Once a group of geometric objects have been processed and rasterized into pixel data, the pixel shader 602 is invoked to further compute output information and cause results to be written to output surfaces (e.g., color buffers, depth buffers, stencil buffers, etc.). In one embodiment, the pixel shader 602 calculates the values of the various vertex attributes that are to be interpolated across the rasterized object. The pixel shader 602 then executes an API-supplied pixel shader program. To execute the pixel shader program, the pixel shader 602 dispatches threads to an execution unit (e.g., 608A) via the thread dispatcher 604. The pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In one embodiment, the data port 614 provides a memory access mechanism for the thread execution logic 600 output processed data to memory for processing on a graphics processor output pipeline. In one embodiment, the data port 614 includes or couples to one or more cache memories (e.g., data cache 612) to cache data for memory access via the data port.

FIG. 7 is a block diagram illustrating a graphics processor execution unit instruction format according to an embodiment. In one embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. The instruction format described an illustrated are macro-instructions, in that they are instructions supplied to the execution unit, as opposed to micro-operations resulting from instruction decode once the instruction is processed.

In one embodiment, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 varies by embodiment. In one embodiment, the instruction is compacted in part using a set of index values in an index field 713. The execution unit hardware references a set of compaction tables based on the index values and uses the compaction table outputs to reconstruct a native instruction in the 128-bit format 710.

For each format, an instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. An instruction control field 712 enables control over certain execution options, such as channels selection (e.g., predication) and data channel order (e.g., swizzle). For 128-bit instructions 710 an exec-size field 716 limits the number of data channels that will be executed in parallel. The exec-size field 716 is not available for use in the 64-bit compact instruction format 730.

Some execution unit instructions have up to three operands including two source operands, src0 722, src1 722, and one destination 718. In one embodiment, the execution units support dual destination instructions, where one of the destinations is implied. Data manipulation instructions can have a third source operand (e.g., SRC2 724), where the instruction opcode JJ12 determines the number of source operands. An instruction's last source operand can be an immediate (e.g., hard-coded) value passed with the instruction.

In one embodiment instructions are grouped based on opcode bit-fields to simplify Opcode decode 740. For an 8-bit opcode, bits 4, 5, and 6 allow the execution unit to determine the type of opcode. The precise opcode grouping shown is exemplary. In one embodiment, a move and logic opcode group 742 includes data movement and logic instructions (e.g., mov, cmp). The move and logic group 742 shares the five most significant bits (MSB), where move instructions are in the form of 0000xxxxb (e.g., 0x0x) and logic instructions are in the form of 0001xxxxb (e.g., 0x01). A flow control instruction group 744 (e.g., call, jmp) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, mul) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 8:
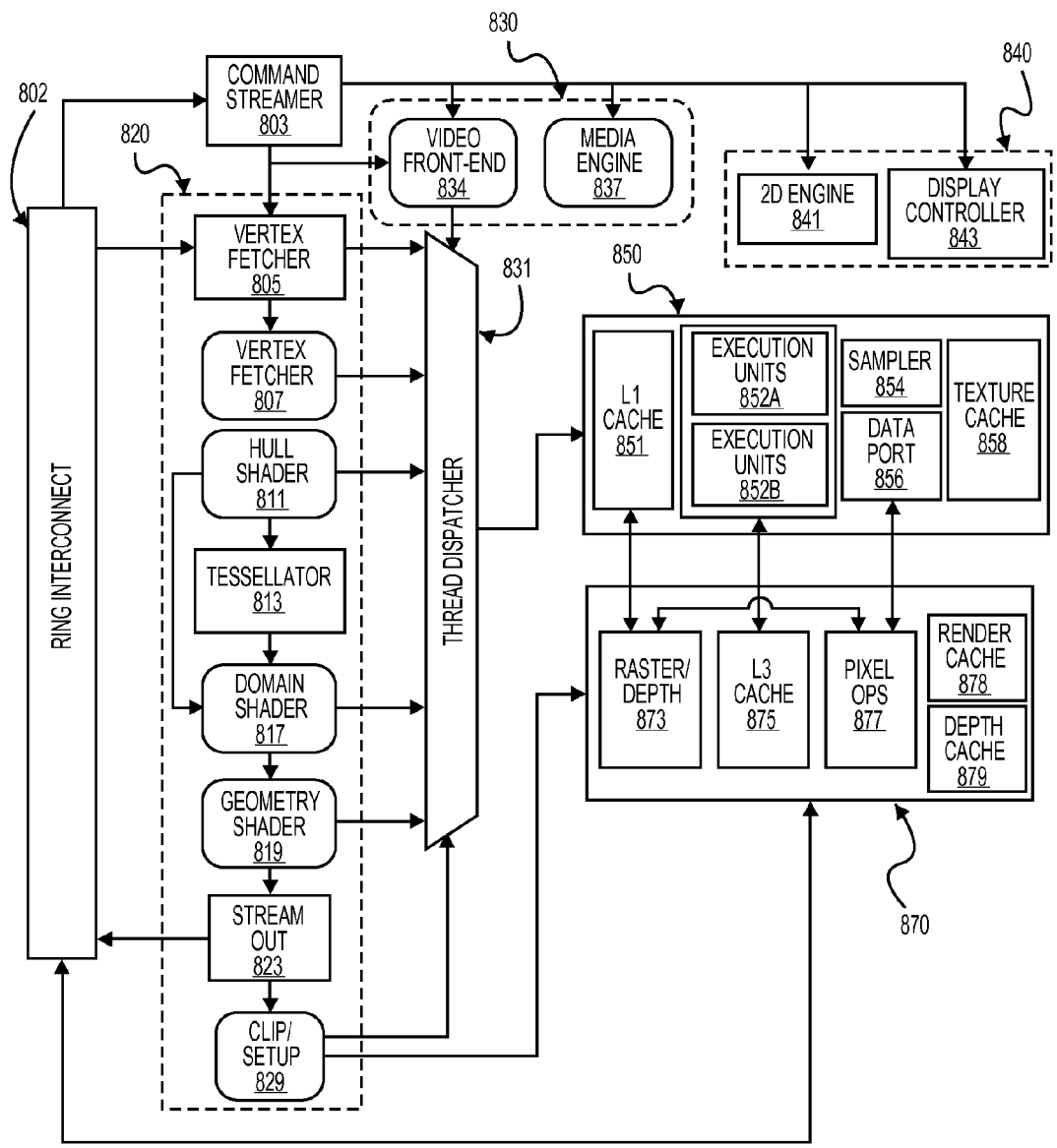
FIG. 8 is a block diagram of another embodiment of a graphics processor which includes a graphics pipeline, a media pipeline, a display engine, thread execution logic, and a render output pipeline.

Graphics Pipeline—FIG. 8

FIG. 8 is a block diagram of another embodiment of a graphics processor which includes a graphics pipeline 820, a media pipeline 830, a display engine 840, thread execution logic 850, and a render output pipeline 870. In one embodiment, the graphics processor is a graphics processor within a multi-core processing system that includes one or more general purpose processing cores. The graphics processor is controlled by register writes to one or more control registers (not shown) or via commands issued to the graphics processor via a ring interconnect 802. The ring interconnect 802 couples the graphics processor to other processing components, such as other graphics processors or general-purpose processors. Commands from the ring interconnect are interpreted by a command streamer 803 which supplies instructions to individual components of the graphics pipeline 820 or media pipeline 830.

The command streamer 803 directs the operation of a vertex fetcher 805 component that reads vertex data from memory and executes vertex-processing commands provided by the command streamer 803. The vertex fetcher 805 provides vertex data to a vertex shader 807, which performs coordinate space transformation and lighting operations to each vertex. The vertex fetcher 805 and vertex shader 807 execute vertex-processing instructions by dispatching execution threads to the execution units 852A, 852B via a thread dispatcher 831.

In one embodiment, the execution units 852A, 852B are an array of vector processors having an instruction set for performing graphics and media operations. The execution units 852A, 852B have an attached L1 cache 851 that is specific for each array or shared between the arrays. The cache can be configured as a data cache, an instruction cache, or a single cache that is partitioned to contain data and instructions in different partitions.

In one embodiment, the graphics pipeline 820 includes tessellation components to perform hardware-accelerated tessellation of 3D objects. A programmable hull shader 811 configures the tessellation operations. A programmable domain shader 817 provides back-end evaluation of tessellation output. A tessellator 813 operates at the direction of the hull shader 811 and contains special purpose logic to generate a set of detailed geometric objects based on a coarse geometric model that is provided as input to the graphics pipeline 820. If tessellation is not used, the tessellation components 811, 813, 817 can be bypassed.

The complete geometric objects can be processed by a geometry shader 819 via one or more threads dispatched to the execution units 852A, 852B, or can proceed directly to the clipper 829. The geometry shader operates on entire geometric objects, rather than vertices or patches of vertices as in previous stages of the graphics pipeline. If the tessellation is disabled the geometry shader 819 receives input from the vertex shader 807. The geometry shader 819 is programmable by a geometry shader program to perform geometry tessellation if the tessellation units are disabled.

Prior to rasterization, vertex data is processed by a clipper 829, which is either a fixed function clipper or a programmable clipper having clipping and geometry shader functions. In one embodiment, a rasterizer 873 in the render output pipeline 870 dispatches pixel shaders to convert the geometric objects into their per pixel representations. In one embodiment, pixel shader logic is included in the thread execution logic 850.

The graphics engine has an interconnect bus, interconnect fabric, or some other interconnect mechanism that allows data and message passing amongst the major components of the graphics engine. In one embodiment the execution units 852A, 852B and associated cache(s) 851, texture and media sampler 854, and texture/sampler cache 858 interconnect via a data port 856 to perform memory access and communicate with render output pipeline components of the graphics engine. In one embodiment, the sampler 854, caches 851, 858 and execution units 852A, 852B each have separate memory access paths.

In one embodiment, the render output pipeline 870 contains a rasterizer and depth test component 873 that converts vertex-based objects into their associated pixel-based representation. In one embodiment, the rasterizer logic includes a windower/masker unit to perform fixed function triangle and line rasterization. An associated render and depth buffer caches 878, 879 are also available in one embodiment. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In one embodiment a shared L3 cache 875 is available to all graphics components, allowing the sharing of data without the use of main system memory.

The graphics processor media pipeline 830 includes a media engine 337 and a video front end 834. In one embodiment, the video front end 834 receives pipeline commands from the command streamer 803. However, in one embodiment the media pipeline 830 includes a separate command streamer. The video front-end 834 processes media commands before sending the command to the media engine 837. In one embodiment, the media engine includes thread spawning functionality to spawn threads for dispatch to the thread execution logic 850 via the thread dispatcher 831.

In one embodiment, the graphics engine includes a display engine 840. In one embodiment, the display engine 840 is external to the graphics processor and couples with the graphics processor via the ring interconnect 802, or some other interconnect bus or fabric. The display engine 840 includes a 2D engine 841 and a display controller 843. The display engine 840 contains special purpose logic capable of operating independently of the 3D pipeline. The display controller 843 couples with a display device (not shown), which may be a system integrated display device, as in a laptop computer, or an external display device attached via an display device connector.

The graphics pipeline 820 and media pipeline 830 are configurable to perform operations based on multiple graphics and media programming interfaces and are not specific to any one application programming interface (API). In one embodiment, driver software for the graphics processor translates API calls that are specific to a particular graphics or media library into commands that can be processed by the graphics processor. In various embodiments, support is provided for the Open Graphics Library (OpenGL) and Open Computing Language (OpenCL™) supported by the Khronos Group, the Direct3D library from the Microsoft Corporation, or, in one embodiment, both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Figure 9:
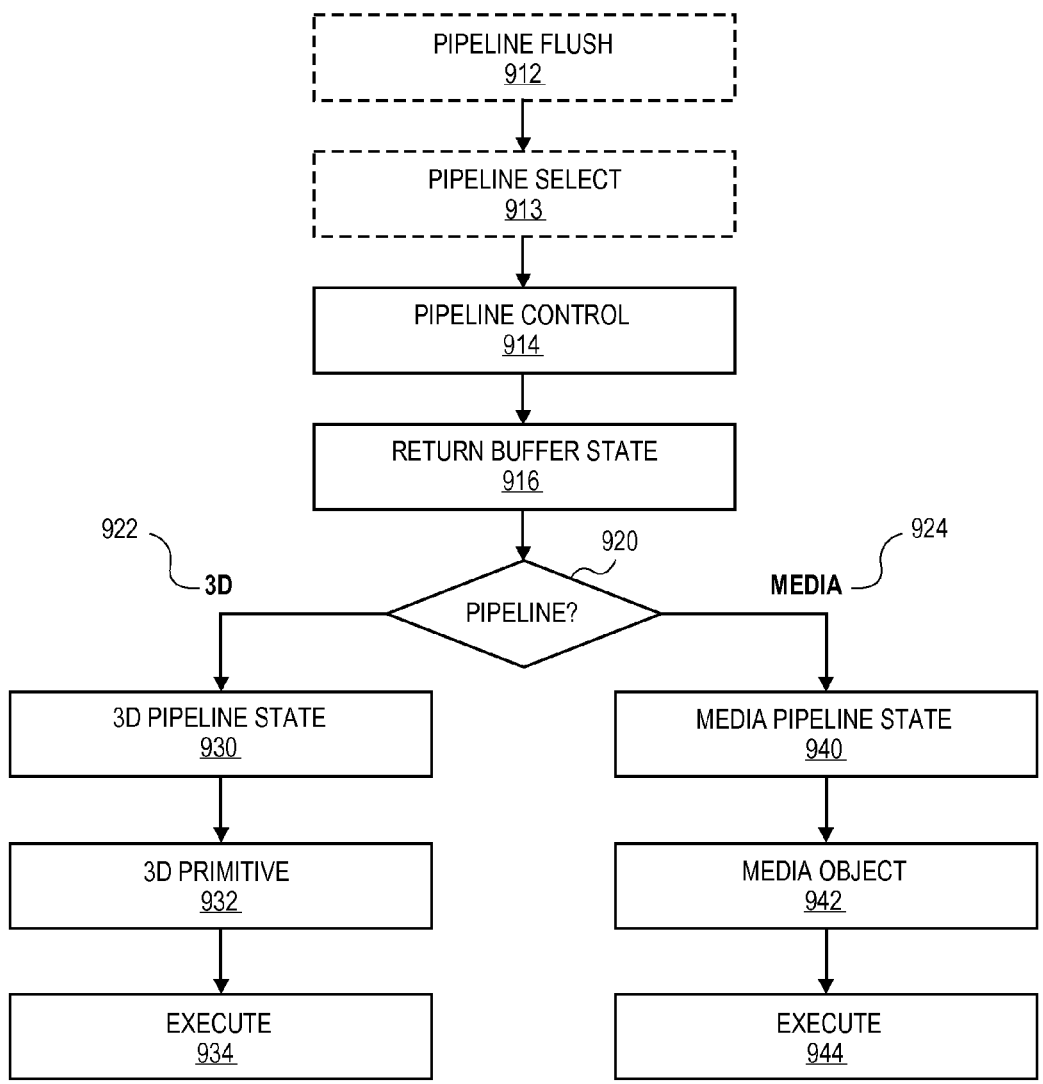
FIG. 9A is a block diagram illustrating a graphics processor command format according to an embodiment and FIG. 9B is a block diagram illustrating a graphics processor command sequence according to an embodiment.

Graphics Pipeline Programming—FIG. 9A-B

FIG. 9A is a block diagram illustrating a graphics processor command format according to an embodiment and FIG. 9B is a block diagram illustrating a graphics processor command sequence according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

The client 902 specifies the client unit of the graphics device that processes the command data. In one embodiment, a graphics processor command parser examines the client field of each command to condition the further processing of the command and route the command data to the appropriate client unit. In one embodiment, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in the data 906 field of the command. For some commands an explicit command size 908 is expected to specify the size of the command. In one embodiment, the command parser automatically determines the size of at least some of the commands based on the command opcode. In one embodiment commands are aligned via multiples of a double word.

The flow chart in FIG. 9B shows a sample command sequence 910. In one embodiment, software or firmware of a data processing system that features an embodiment of the graphics processor uses a version of the command sequence shown to set up, execute, and terminate a set of graphics operations. A sample command sequence is shown and described for exemplary purposes, however embodiments are not limited to these commands or to this command sequence. Moreover, the commands may be issued as batch of commands in a command sequence, such that the graphics processor will process the sequence of commands in an at least partially concurrent manner.

The sample command sequence 910 may begin with a pipeline flush command 912 to cause any active graphics pipeline to complete the currently pending commands for the pipeline. In one embodiment, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. A pipeline flush command 912 can be used for pipeline synchronization or before placing the graphics processor into a low power state.

A pipeline select command 913 is used when a command sequence requires the graphics processor to explicitly switch between pipelines. A pipeline select command 913 is required only once within an execution context before issuing pipeline commands unless the context is to issue commands for both pipelines. In one embodiment, a pipeline flush command is 912 is required immediately before a pipeline switch via the pipeline select command 913.

A pipeline control command 914 configures a graphics pipeline for operation and is used to program the 3D pipeline 922 and the media pipeline 924. The pipeline control command 914 configures the pipeline state for the active pipeline. In one embodiment, the pipeline control command 914 is used for pipeline synchronization and to clear data from one or more cache memories within the active pipeline before processing a batch of commands.

Return buffer state commands 916 are used to configure a set of return buffers for the respective pipelines to write data. Some pipeline operations require the allocation, selection, or configuration of one or more return buffers into which the operations write intermediate data during processing. The graphics processor also uses one or more return buffers to store output data and to perform cross thread communication. The return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. 3D pipeline state 930 commands are also able to selectively disable or bypass certain pipeline elements if those elements will not be used.

The 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. The 3D primitive 932 command is used to perform vertex operations on 3D primitives via vertex shaders. To process vertex shaders, the 3D pipeline 922 dispatches shader execution threads to graphics processor execution units.

The 3D pipeline 922 is triggered via an execute 934 command or event. In one embodiment a register write triggers command execution. In one embodiment execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

The sample command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. The media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

The media pipeline 924 is configured in a similar manner as the 3D pipeline 922. A set of media pipeline state commands 940 are dispatched or placed into in a command queue before the media object commands 942. The media pipeline state commands 940 include data to configure the media pipeline elements that will be used to process the media objects. This includes data to configure the video decode and video encode logic within the media pipeline, such as encode or decode format. The media pipeline state commands 940 also support the use one or more pointers to "indirect" state elements that contain a batch of state settings.

Media object commands 942 supply pointers to media objects for processing by the media pipeline. The media objects include memory buffers containing video data to be processed. In one embodiment, all media pipeline state must be valid before issuing a media object command 942. Once the pipeline state is configured and media object commands 942 are queued, the media pipeline 924 is triggered via an execute 934 command or an equivalent execute event (e.g., register write). Output from the media pipeline 924 may then be post processed by operations provided by the 3D pipeline 922 or the media pipeline 924. In one embodiment, GPGPU operations are configured and executed in a similar manner as media operations.

Figure 10:
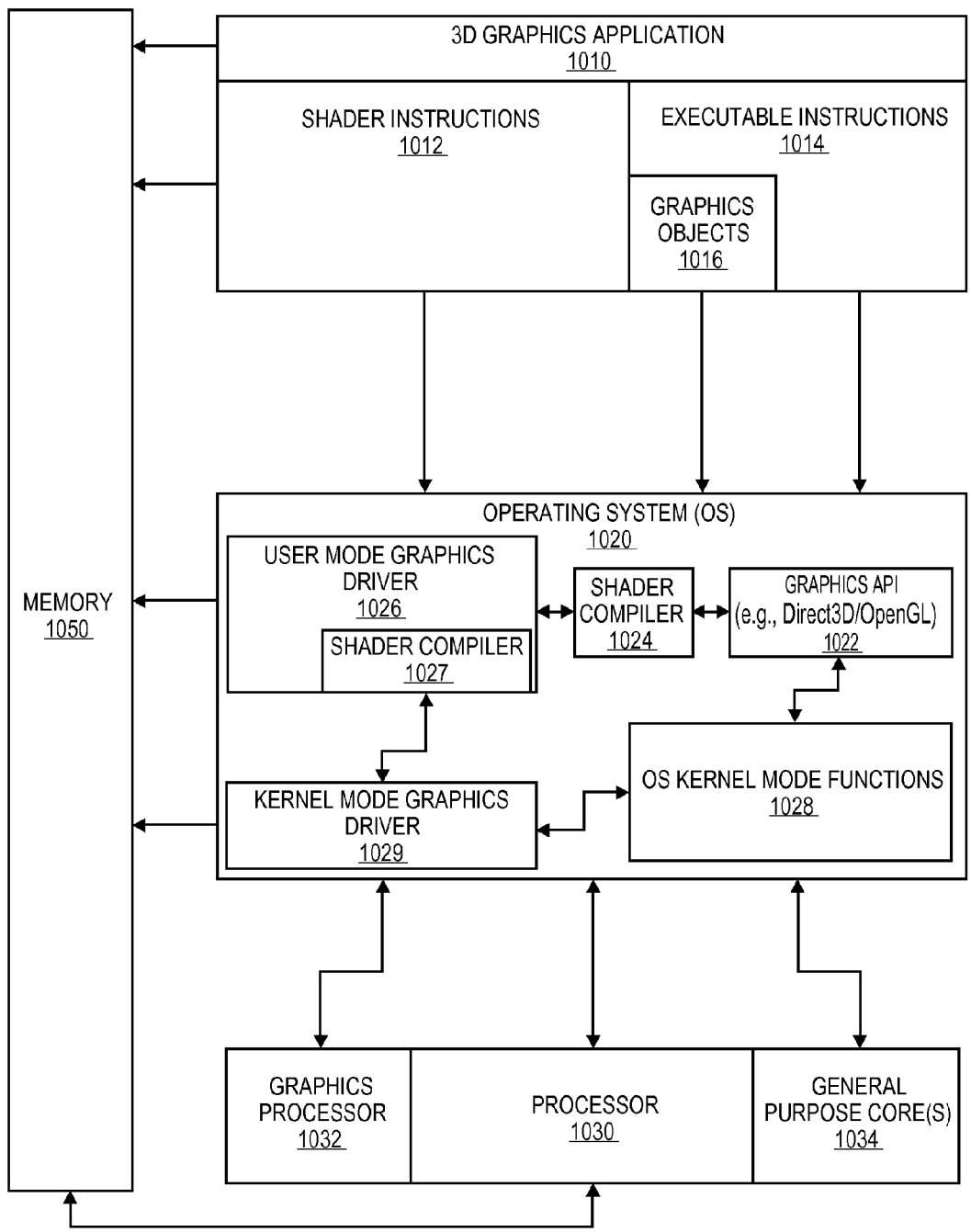
FIG. 10 illustrates exemplary graphics software architecture for a data processing system according to an embodiment.

Graphics Software Architecture—FIG. 10

FIG. 10 illustrates exemplary graphics software architecture for a data processing system according to an embodiment. The software architecture includes a 3D graphics application 1010, an operating system 1020, and at least one processor 1030. The processor 1030 includes a graphics processor 1032 and one or more general-purpose processor core(s) 1034. The graphics application 1010 and operating system 1020 each execute in the system memory 1050 of the data processing system.

In one embodiment, the 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

The operating system 1020 may be a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time compilation or the application can perform share pre-compilation. In one embodiment, high-level shaders are compiled into low-level shaders during the compilation of the 3D graphics application 1010.

The user mode graphics driver 1026 may contain a back-end shader compiler 1027 to convert the shader instructions 1012 into a hardware specific representation. When the OpenGL API is in use, shader instructions 1012 in the GLSL high-level language are passed to a user mode graphics driver 1026 for compilation. The user mode graphics driver uses operating system kernel mode functions 1028 to communicate with a kernel mode graphics driver 1029. The kernel mode graphics driver 1029 communicates with the graphics processor 1032 to dispatch commands and instructions.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

Figure 11:
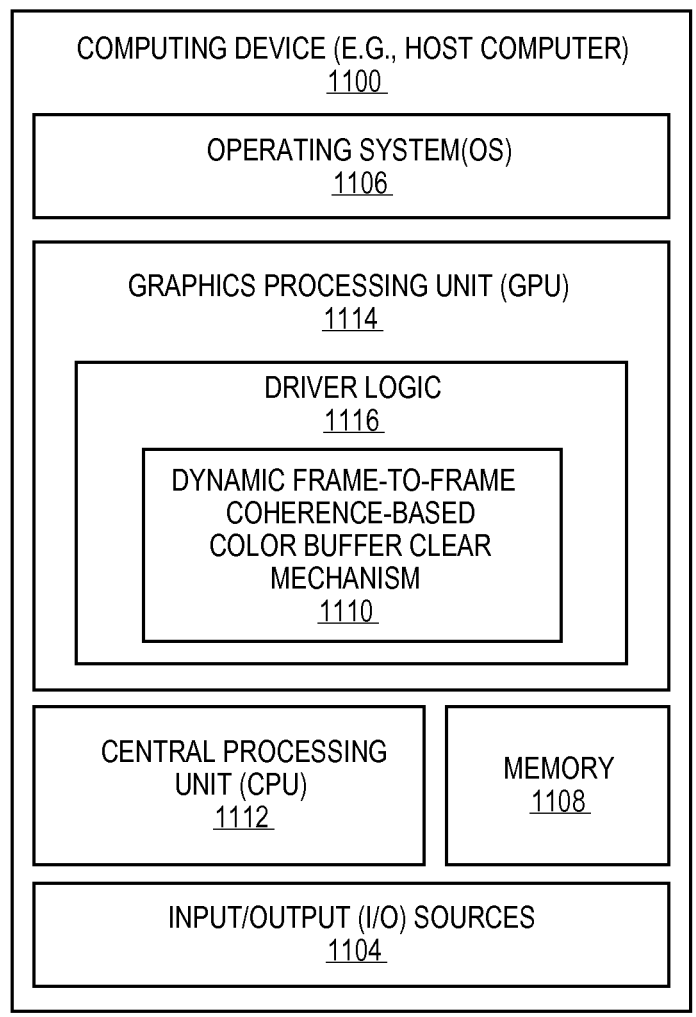
FIG. 11 illustrates a computing device employing a dynamic frame-to-frame coherence-based color buffer clear mechanism according to one embodiment.

FIG. 11 illustrates a computing device 1100 employing a dynamic frame-to-frame coherence-based color buffer clear mechanism 1110 according to one embodiment. Computing device 1100 (e.g., mobile computing device, desktop computer, etc.) may be the same as data processing system 100 of FIG. 1 and accordingly, for brevity and ease of understanding, many of the details stated above with reference to FIGS. 1-10 are not further discussed or repeated hereafter. Computing device 1100 may include a mobile computing device (e.g., smartphone, tablet computer, laptops, game consoles, portable workstations, etc.) serving as a host machine for hosting dynamic frame-to-frame coherence-based color buffer clear mechanism ("clear mechanism") 1110 for facilitating dynamic optimization and performance of color buffer clear by leveraging usage and application of frame-to-frame coherence according to one embodiment. Clear mechanism 1110 may include any number and type of components to perform various tasks to facilitate efficient GPU-based color buffer clearing, such as at GPU 1114 of computing device 1100, as will be further described throughout this document. It is to be noted that throughout this document, terms like "graphics domain" may be referenced interchangeably with "graphics processing unit" or simply "GPU" and similarly, "CPU domain" or "host domain" may be referenced interchangeably with "computer processing unit" or simply "CPU".

Computing device 1100 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 1100 may include mobile computing devices serving as communication devices, such as cellular phones including smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, computing device 1100 may include a mobile computing device employing an integrated circuit ("IC"), such as system on a chip ("SoC" or "SOC"), integrating various hardware and/or software components of computing device 1100 on a single chip.

As illustrated, in one embodiment, in addition to employing clear mechanism 1110, computing device 1100 may further include any number and type of hardware components and/or software components, such as (but not limited to) CPU 1112, GPU 1114 having graphics driver logic 1116 hosting clear mechanism 1110, memory 1108, network devices, drivers, or the like, as well as input/output (I/O) sources 1104, such as touchscreens, touch panels, touch pads, virtual or regular keyboards, virtual or regular mice, ports, connectors, etc. Computing device 1100 may include operating system (OS) 1106 serving as an interface between hardware and/or physical resources of the computer device 1100 and a user. It is contemplated that CPU 1112 may include one or processors, such as processor(s) 102 of FIG. 1, while GPU 1114 may include one or more graphics processors, such as graphics processor(s) 108 of FIG. 1. In one embodiment and as will be further descried with reference to the subsequent figures, clear mechanism 1110 may be in communication with its host driver logic 1116 which cooperates with GPU 1114 to facilitate any number and type of tasks facilitating GPU-based parallel scheduling of commands as is described through this document.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

It is contemplated and as further described with reference to FIGS. 1-10, some processes of the graphics pipeline as described above are implemented in software, while the rest are implemented in hardware. A graphics pipeline may be implemented in a graphics coprocessor design, where CPU 1112 is designed to work with GPU 1114 which may be included in or co-located with CPU 1112. In one embodiment, GPU 1114 may employ any number and type of conventional software and hardware logic to perform the conventional functions relating to graphics rendering as well as novel software and hardware logic to execute any number and type of instructions, such as instructions 121 of FIG. 1, to perform the various novel functions of clear mechanism 1110 as disclosed throughout this document.

As aforementioned, memory 1108 may include a random access memory (RAM) comprising application database having object information. A memory controller hub, such as memory controller hub 116 of FIG. 1, may access data in the RAM and forward it to GPU 1114 for graphics pipeline processing. RAM may include double data rate RAM (DDR RAM), extended data output RAM (EDO RAM), etc. CPU 1112 interacts with a hardware graphics pipeline, as illustrated with reference to FIG. 3, to share graphics pipelining functionality. Processed data is stored in a buffer in the hardware graphics pipeline, and state information is stored in memory 1108. The resulting image is then transferred to a display component or device, such as display device 320 of FIG. 3, for displaying. It is contemplated that the display device may be of various types, such as Cathode Ray Tube (CRT), Thin Film Transistor (TFT), Liquid Crystal Display (LCD), Organic Light Emitting Diode (OLED) array, etc., to display information to a user.

Memory 1108 may comprise a pre-allocated region of a buffer (e.g., framebuffer); however, it should be understood by one of ordinary skill in the art that the embodiments are not so limited, and that any memory accessible to the lower graphics pipeline may be used. Computing device 1100 may further include input/output (I/O) control hub (ICH) 130 as referenced in FIG. 1, one or more I/O devices, etc.

CPU 1112 may include one or more processors to execute instructions in order to perform whatever software routines the computing system implements. The instructions frequently involve some sort of operation performed upon data. Both data and instructions may be stored in system memory 1108 and any associated cache. Cache is typically designed to have shorter latency times than system memory 1108; for example, cache might be integrated onto the same silicon chip(s) as the processor(s) and/or constructed with faster static RAM (SRAM) cells whilst the system memory 1108 might be constructed with slower dynamic RAM (DRAM) cells. By tending to store more frequently used instructions and data in the cache as opposed to the system memory 1108, the overall performance efficiency of computing device 1100 improves. It is contemplated that in some embodiments, GPU 1114 may exist as part of CPU 1112 (such as part of a physical CPU package) in which case, memory 1108 may be shared by CPU 1112 and GPU 1114 or kept separated.

System memory 1108 may be made available to other components within the computing device 1100. For example, any data (e.g., input graphics data) received from various interfaces to the computing device 1100 (e.g., keyboard and mouse, printer port, Local Area Network (LAN) port, modem port, etc.) or retrieved from an internal storage element of the computer device 1100 (e.g., hard disk drive) are often temporarily queued into system memory 1108 prior to their being operated upon by the one or more processor(s) in the implementation of a software program. Similarly, data that a software program determines should be sent from the computing device 1100 to an outside entity through one of the computing system interfaces, or stored into an internal storage element, is often temporarily queued in system memory 1108 prior to its being transmitted or stored.

Further, for example, an ICH, such as ICH 130 of FIG. 1, may be used for ensuring that such data is properly passed between the system memory 1108 and its appropriate corresponding computing system interface (and internal storage device if the computing system is so designed) and may have bi-directional point-to-point links between itself and the observed I/O devices. Similarly, an MCH, such as MCH 116 of FIG. 1, may be used for managing the various contending requests for system memory 1108 accesses amongst CPU 1112 and GPU 1114, interfaces and internal storage elements that may proximately arise in time with respect to one another.

I/O sources 1104 may include one or more I/O devices that are implemented for transferring data to and/or from computing device 1100 (e.g., a networking adapter); or, for a large scale non-volatile storage within computing device 1100 (e.g., hard disk drive). User input device, including alphanumeric and other keys, may be used to communicate information and command selections to GPU 1114. Another type of user input device is cursor control, such as a mouse, a trackball, a touchscreen, a touchpad, or cursor direction keys to communicate direction information and command selections to GPU 1114 and to control cursor movement on the display device. Camera and microphone arrays of computer device 1100 may be employed to observe gestures, record audio and video and to receive and transmit visual and audio commands.

Computing device 1100 may further include network interface(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing device 1100 may vary from implementation to implementation depending upon numerous factors, such as price constraints, performance requirements, technological improvements, or other circumstances. Examples of the electronic device or computer system 1100 may include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Figure 13A:
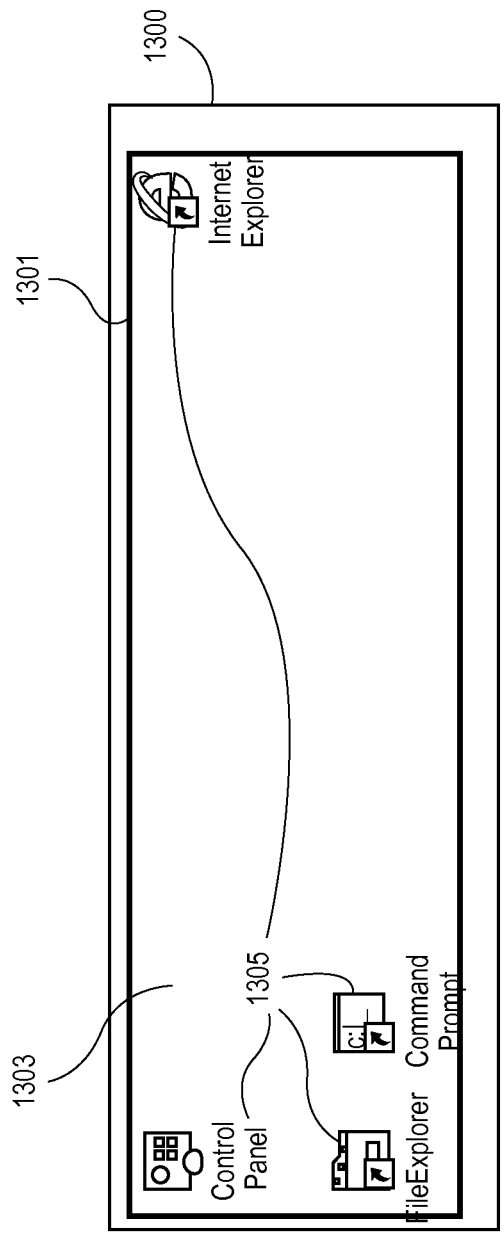
FIG. 13A illustrates a conventional technique for using a bounding box.

Referring now to FIG. 13A, it illustrates a conventional technique 1300 for using a bounding box 1301 for keeping track of rendered region that needs to be cleared on a next frame. As illustrated, bounding box 1301 encompassing rendered application icons 1305 along with background color area 1303 which means if bounding box 1301 is used for approximation of the area rendered, too much of the area would be considered area rendered, such as including both background color area 1303 and rendered application icons 1305. In other words, everything within bounding box 1301 is marked as drawn with bounding box 1301. On a subsequent frame of the application, the bounding box region is considered as rendered and is cleared even though some of the region was already cleared. Additionally, for applications that write to a full framebuffer, bounding box 1301 is the full framebuffer and the full framebuffer is cleared even though it is overwritten during the rendering operation.

Figure 13B:
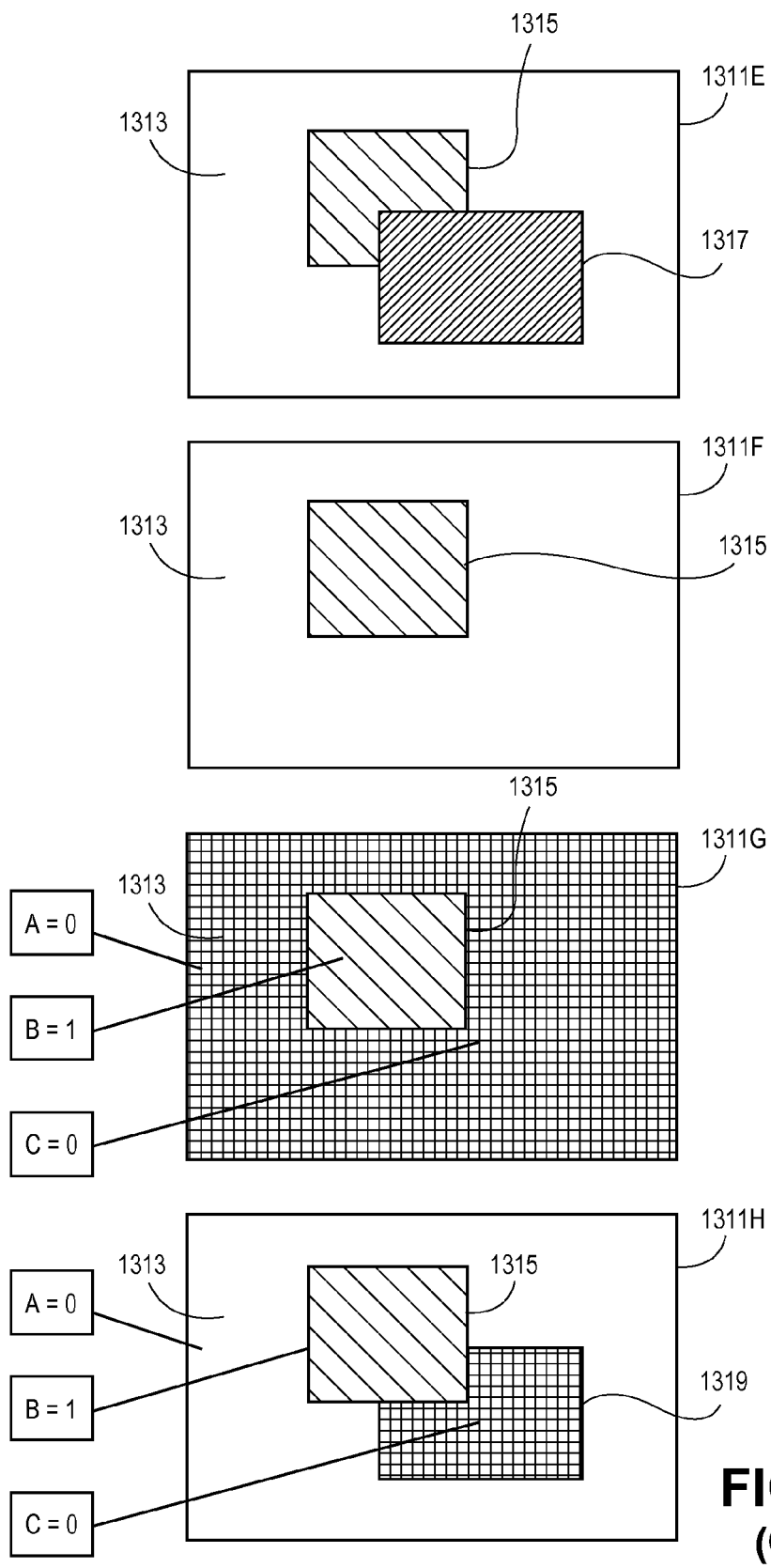
FIG. 13B illustrates an application rendering transaction sequence for optimizing color buffer clear performance in GPUs according to one embodiment according to one embodiment.

FIG. 13B illustrates an application rendering transaction sequence for optimizing color buffer clear performance in GPUs as facilitated by clear mechanism 1110 of FIG. 11 according to one embodiment. It is contemplated that in graphics, images can be complicated and their rendering on frames may be just as complicated, such as involving partial control bits or situations where Resolve operations may be required for transmitting a framebuffer over a network, etc. It is therefore contemplated that embodiments are not limited to any particular form of frames, images, control bits, networks, transmission techniques, protocols, etc., and that FIG. 13B is illustrated here as an example for the sake of brevity, clarity, and ease of understanding.

The illustrated sequence begins with framebuffer 1311A of a frame being cleared with a color (e.g., green, blue, red, black, white, etc.). As illustrated, after this initial clearing operation, framebuffer 1311A may be regarded as a clear framebuffer with a single color occupying all its portions. The number of pixels or memory written for the clear is the full framebuffer.

Subsequently, as illustrated, any amount and type of data may be rendered to occupy corresponding portions 1315, 1317 of framebuffer 1311B, where, for example, the data may include a couple of graphics images occupying portions 1315, 1317 and the corresponding memory buffers of framebuffer 1311B. It is further illustrated that upon having occupied portions 1315, 1317 of framebuffer 1311B, the remaining portion 1313 of framebuffer 1311B and its associate memory buffers remain clear as it was previously the case with reference to framebuffer 1311A. However, it is to be noted that even though regions 1315 and 1317 were over-written with other content and hence there was no need to clear them, they were cleared when the full framebuffer was cleared in 1311A.

The wasted clear operations can be optimized in some embodiments. In one such embodiment, this is done by tracking the state of the framebuffer instead of clearing the framebuffer and then performing the clear operation after all the rendering is done.

For better understanding, the states of framebuffer 1311A and 1311B are further illustrated with reference to framebuffer 1311C and 1311D, respectively. For example, framebuffer 1311C is illustrated as a hash square, where each little hash square may be referred to by secondary control bits. Each hash square represents a block of memory in the framebuffer and in one embodiment could represent a cache line or multiple cache lines in another embodiment. In one embodiment, three control bits (e.g., labeled and referenced as A, B, and C) are illustrated as corresponding to portions 1313, 1315, and 1317. When the framebuffer is cleared, instead of clearing the framebuffer, the control bits are set to cleared state. Here, the three control bits, such as A, B, and C, are shown in the Cleared state corresponding to and reflecting the state of framebuffer 1311A. In one embodiment, value 0 represents Cleared and accordingly, A=0, B=0, and C=0. The data in the actual framebuffer could be garbage since the clear operation has been skipped and that the buffer being cleared is tracked in associated control bits, such as control bits A, B, and C, etc.

Now, framebuffer 1311D is shown in Rendered state which corresponds to framebuffer 1311B and accordingly, portions 1315 and 1317 are shown as being rendered and occupied and their corresponding control bits, such as B and C, are shown as having a value of 1. In one embodiment, value 1 represents Rendered and accordingly, B=1 and C=1. It is to be further noted that A continues to have a value of 0 which represents Cleared state since A has not been touched after the clear operation was performed in 1311C. Stated differently, while control bits B and C represent the rendered parts, such as 1315 and 1317, representing valid content, while control bit A continues to represent the background part, such as 1313, which should be in clear state. The framebuffer corresponding to A may continue to be in garbage state.

Further, before this surface, such as framebuffer 1311D, may be displayed or used for other operations, the bits denoted by control bits of A, B, and C may be walked (called the Resolve operation), and if any of the control bits are in the Cleared state, the framebuffer region associated with those control bits may then be populated with the clear color instead of letting them stay in garbage state to ensure that display or other fetch agents fetch the clear color. Accordingly, upon performing the Resolve operation, framebuffer 1311E is completely rendered and can be used for subsequent operations such as displaying the content. It is to be noted that the clear color was not populated for regions denoted by control bits B and C. If the full frame buffer was rendered too and none of the control bits remain in "0" state, there would be no clear color written to the framebuffer.

Now referring to a second application frame 1311F, for example, it illustrates portion 1315 as being rendered and remaining portion 1313 continuing to be clear, while portion 1317 is no longer being shown as rendered, contrary to the illustration of previous frame 1311E. Further, frame 1311F corresponds to framebuffer 1311G where control bits A, B and C are shown. As aforementioned with respect to frame 1311F, portion 1317 or control bit C is no longer shown as rendered by the application and thus C is illustrated as equaling 0, while control bit B equals 1 corresponding to portion 1315, and A equals 0 representing remaining frame portion 1313.

It is to be noted that since the framebuffer is not formally cleared, not only the state A is Cleared, the contents of the framebuffer is already populated with the clear color. For example, the framebuffer may appear as framebuffer 1311H before the resolved operation is performed, where area 1319, associated with control bit C (and corresponding to portion 1317), is marked with hash to indicate that it needs to be fixed with a clear value. Framebuffer 1311H further illustrates frame portion 1315 being marked by control bit B equaling 1 (for being Rendered). Frame 1311H further illustrates remaining frame portion 1313 corresponding to control bit A which is still 0. So, even though control bits A and C are both 0, the framebuffer represented by control bit A is already in clear state, while the framebuffer represented by control bit C needs to be Cleared on a resolve operation.

In one embodiment, the two sets of control bits for the framebuffer may be combined, where the first set of control bits represents the previous frame while the second set of control bits represents the current frame. In one embodiment, when the resolve operation is performed using the combination of the two sets of control bits, a first frame (e.g., frame 1) may be produced as frame 1311D while a second frame (e.g., frame 2) may be produced as frame 1311G. As illustrated, frame 1311D provides A=0 or Cleared, B=1 or Rendered, and C=1 or Rendered; subsequently, frame 1311G continues to provide A=0 or Cleared and B=1 or Rendered, but C which was previously 1 or Rendered is now shown as 0 or Cleared.

In one embodiment, in reviewing frames 1311D and 1311G, various states relating to various portions 1313, 1315, 1317 being represented by A, B, C, respectively, may be illustrated in a Table as follows:

| Frame 1 (Frame 1311D) | Frame 2 (Frame 1311G) | Resolve |
|---|---|---|
| 1. Resolved to Clear (e.g., A) | Needs Resolve to Clear | Nothing to Perform |
| 2. Resolved to Clear | Rendered | Nothing to Perform |
| 3. Rendered (e.g., C) | Needs Resolve to Clear | Resolve to Clear |
| 4. Rendered (e.g., B) | Rendered | Nothing to perform |

Referring to the Table above in light of frames 1311D, 1311G, control bits A, representing portion 1313, relates to condition 1 of the Table such that remaining portion 1313 associated with control bits A needing Resolve to Clear in frame 1311G, but remaining portion 1313 was already monitored or determined to be Resolved in frame 1311D and therefore, in one embodiment, the Resolved operation for A, such as portion 1313, is skipped and no additional performance is needed in frame 1311G.

In one embodiment, control bit C, such as portion 1317, relates to condition 3 of the Table above, where C is shown as being Rendered (data occupying portion 1317) in framebuffer 1311D, but needs to be Resolved (no data occupying portion 1317) in framebuffer 1311G, needing Resolve to Clear for portion 1317 in framebuffer 1311G.

In one embodiment, control bit B, representing portion 1315, relates to condition 4 of the Table above, where B is Rendered (data occupying portion 1315) in framebuffer 1311D and continues to be Rendered (data occupying portion 1315) in framebuffer 1311G and thus, in one embodiment, the Resolve operation for B is skipped and no additional performance is needed in frame 1311G.

In some embodiment, corresponding to condition 2 of the Table, another control bit, such as X (not shown), may be triggered, such as when an image is moved from one location or portion to another location or portion between frames, such as framebuffers 1131D, 1131G. In that case, as shown in condition 2 of the Table, the progression goes from Resolve to Clear in framebuffer 1311D to Rendered in framebuffer 1311G and thus, in one embodiment, the Resolve operation may be skipped and no further performance may be needed in framebuffer 1311G.

In one embodiment, two sets of control bits may be combined and treated as texture maps and this combination may be performed, via clear mechanism 1110 of FIG. 12, using, for example, GPU shader language operations where an operation may be as follows: ResolveBit=Frame 2 resolveBit|~Frame 1 resolveBit. In one embodiment, instead of working on each control bit at a time, a set of control bits may be treated as a color value, such as a single operation in the GPU may be used, for example, to write out a number of bits, such as 32bits, in a single clock for a small pixel, such as R8G8B8A8 pixel, and by treating this small pixel as a larger pixel, such as R16G16B16A16 pixel, a number of control bits, such as 64 control bits, may be combined in a single clock.

Figure 12:
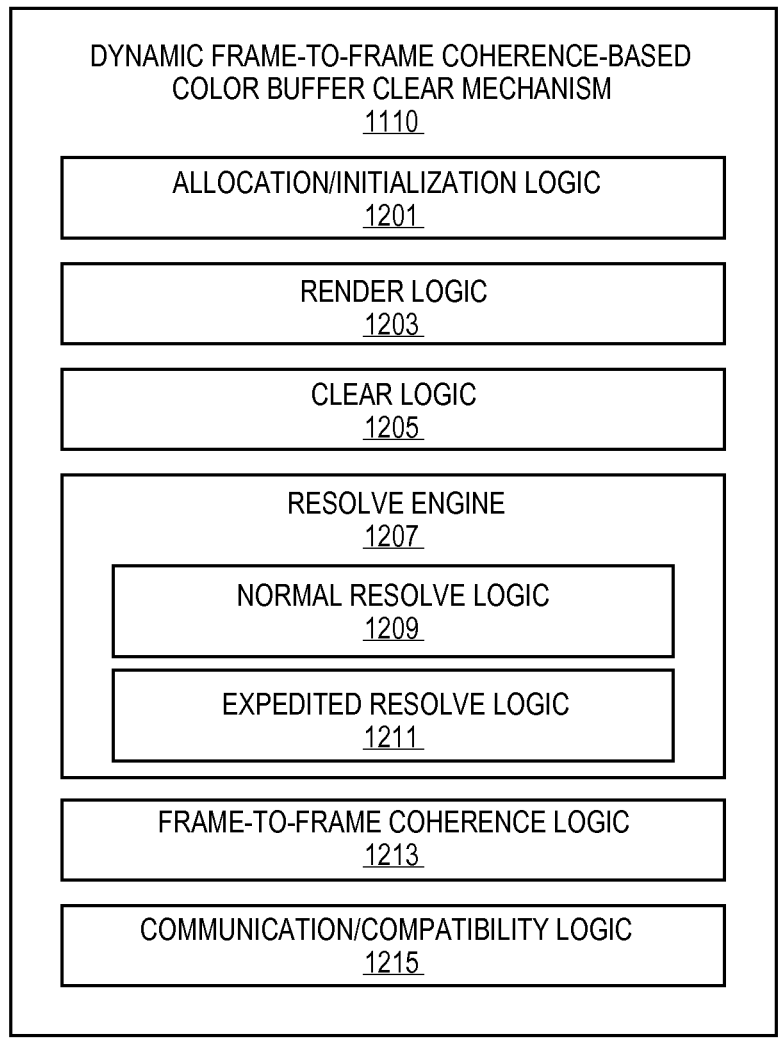
FIG. 12 illustrates a dynamic frame-to-frame coherence-based color buffer clear mechanism according to one embodiment.

Further, in one embodiment, using clear mechanism 1110 of FIG. 12, multiple sets of control bits may be allocated to frames and then combined to deduce a minimum set of resolve bits. This combination may occur at a high execution rate with low memory bandwidth consumption, where the resulting resolve bits, now having built in a frame-to-frame coherence, are used to perform an expedited resolve operation, saving GPU time, memory transactions, and power. It is contemplated that although throughout this document, two sets of control bits are discussed, embodiments are not limited to two or any number of sets of control bits and that multiple sets of control bits may be allocated and combined as desired or necessitated.

FIG. 13C illustrates hardware solution for optimizing color buffer clear performance in GPUs according to one embodiment. In one embodiment, a hardware solution may be provided for optimizing color buffer clear performance in GPUs such that, as aforementioned, 0 represents Cleared, 1 represents Rendered, and 2 represents Cleared but Resolved (such that no resolved operation is needed). Stated differently, in one embodiment, a hardware solution is provided where the control bits may be associated with the cache lines. For example, when a framebuffer is first cleared, additional hardware may be added for the Resolved operation and the additional state of Cleared but Resolved or simply, ClearedButResolved, as illustrated with reference to frame 1311I, where A=2 representing Cleared but Resolved, while B and C equal 0 representing Cleared. Now, after the Rendered operation, the control bits change as shown with reference to framebuffer 1311J, where A=2 representing portion 1313, but B=1 representing portion 1321 and C=0 representing portion 1323.

Now, when the resolve is done, there remains no need to do a resolve operation on data represented by control bits A, which equals 2 and represents portion 1313, and that only control bits represented by C, equaling 0 and representing portion 1319, may need to be Resolved. As a result of this technique, the resolve operation is executed much faster while consuming much smaller bandwidth for a various classes of application frames, etc.

Referring now to FIG. 12, it illustrates a dynamic frame-to-frame coherence-based color buffer clear mechanism 1110 according to one embodiment. In one embodiment, clear mechanism 1110 may include any number and type of components to perform various tasks relating to facilitating graphics domain-based dynamic, efficient, and accurate rendering of graphics images at computing devices, such as computing device 1100 of FIG. 11. For example and in one embodiment, clear mechanism 1110 may include (but not limited to): allocation/initialization logic 1201; render logic 1203; clear logic 1205; resolve engine 1207 including normal resolve logic 1209 and expedited resolve logic 1211; frame-to-frame coherence logic 1213; and communication/compatibility logic 1215. It is further illustrated and as aforementioned with reference to FIG. 11, clear mechanism 1110 may be part of driver logic 1116 which cooperates with GPU 1114 which in turn facilitates one or more tasks relating to clear mechanism 1110.

In one embodiment, allocation/initialization logic 1201 may be used to allocate and initialize a first set of control bits associated with a framebuffer, where render logic 1203 may then be use to render a first frame (also referred to as "primary frame" or "previous frame"). Upon rendering the first frame, normal resolve logic 1209 of resolve engine 1207 may then perform a resolve operation normally without any frame-to-frame coherence. In one embodiment, allocation/initialization logic 1201 may then be used to allocate a second set of control bits a second frame (also referred to as "secondary frame" or "current frame"). The second frame is then rendered via render logic 1203.

In one embodiment, frame-to-frame coherence logic 1213 may be used to determine a frame-to-frame coherence based on a combination of the first and second frames such that a minimum set of resolve bits may be deduced based on using the two sets of control bits frame-to-frame coherence. Subsequently, based on the deduced minimum set of resolve bits, expedited resolve logic 1211 may facilitate an expedited resolve operation. In some embodiments, this technique may continue with the rendering of a next frame with an exchange of the first and second sets of control bits.

In another embodiment, allocation/initialization logic 1201 may be used to allocate and initialize enhanced control bits associated with a framebuffer, where render logic 1203 is used to render a first frame. Upon rendering the first frame, normal resolve logic 209 performs a resolve operation normally without any frame-to-frame coherence.

Further, in one embodiment, clear logic 1205 may perform a clear operation for a next frame, where the clear operation not only initializes the enhanced bits, but also sets some control bits as Cleared but Resolved. Subsequently, the next frame is rendered by render logic 1203. In one embodiment, expedited resolve logic 1211 facilitates a fast or expedited resolve operation based on the enhanced control bits that automatically incorporate a frame-to-frame coherence associated with the first and second frames. In some embodiments, this technique may continue with performing a clear operation for a next frame.

Communication/compatibility logic 1215 may be used to facilitate dynamic communication and compatibility between one or more computing devices, such as computing device 1100 of FIG. 11, and any number and type of other computing devices (such as mobile computing device, desktop computer, server computing device, etc.), processing devices (such as central processing unit (CPU), graphics processing unit (GPU), etc.), image capturing devices (such as camera), display elements (such as display component, display device, display screen, etc.), user/context-awareness components and/or identification/verification sensors/devices (such as biometric sensor/detector, scanner, etc.), memory or storage devices, databases and/or data sources (such as data storage device, hard drive, solid-state drive, hard disk, memory card or device, memory circuit, etc.), networks (e.g., cloud network, the Internet, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", and the like, may be referenced interchangeably and include, by way of example, software, hardware, and/or any combination of software and hardware, such as firmware. Further, any use of a particular brand, word, term, phrase, name, and/or acronym, such as "GPU", "GPU domain", "CPU", "CPU domain", "thread", "buffer", "command", "command buffer", "framebuffer" or "framebuffer", "Cleared", "Rendered", "Resolved", "Cleared but Resolved" or "ClearedButResolved", "control bits", "frame-to-frame coherence", "driver", "driver logic", "OpenGL™", "OpenCL™", etc., should not be read to limit embodiments to software or devices that carry that label in products or in literature external to this document.

It is contemplated that any number and type of components may be added to and/or removed from clear mechanism 1110 to facilitate various embodiments including adding, removing, and/or enhancing certain features. For brevity, clarity, and ease of understanding of clear mechanism 1110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 14A:
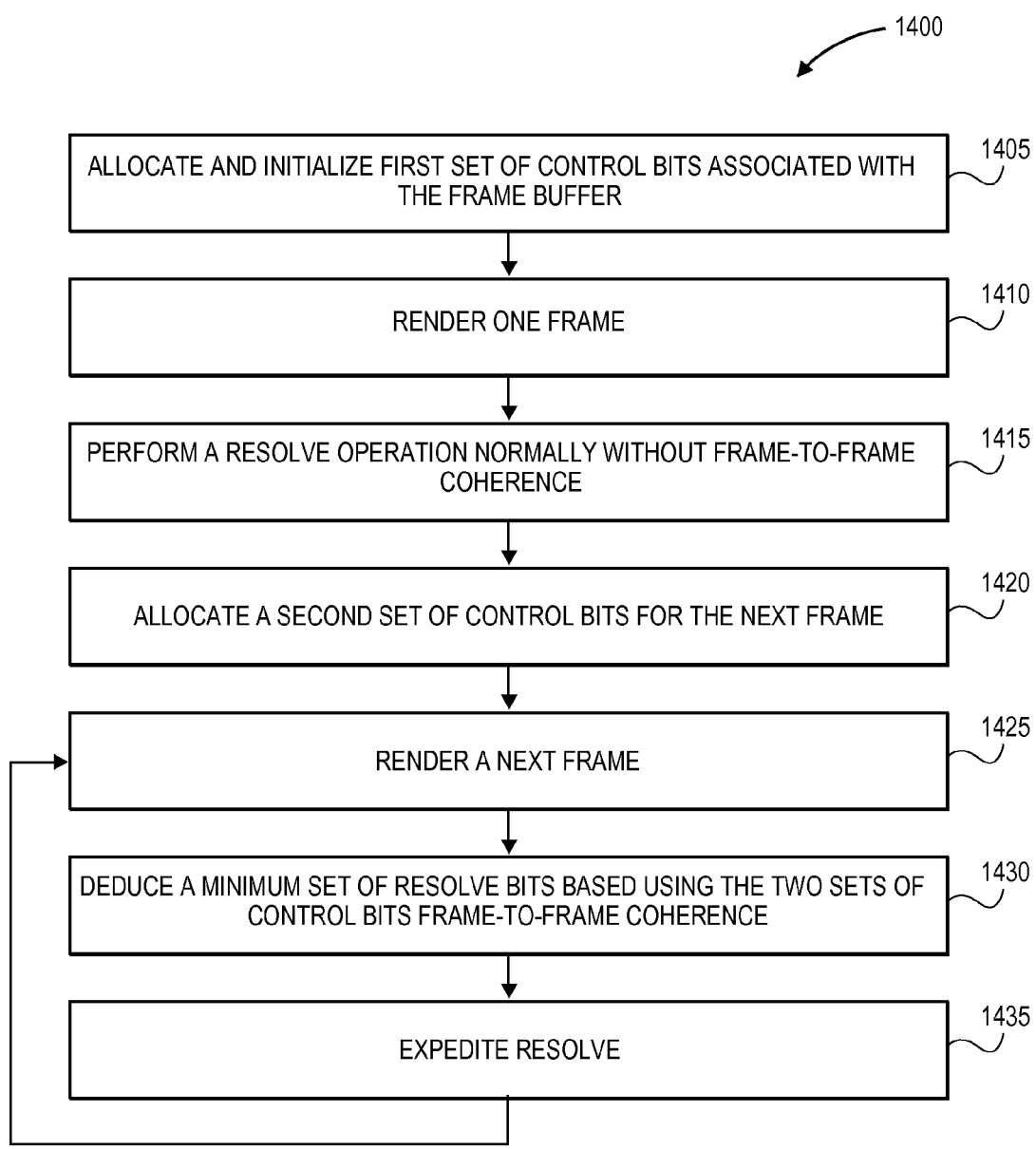
FIG. 14A illustrates a method for dynamically optimizing color buffer clear performance in graphics processing units according to one embodiment.

FIG. 14A illustrates a method 1400 for dynamically optimizing color buffer clear performance in GPUs according to one embodiment. Method 1400 may be performed by processing logic that may comprise hardware (e.g., circuitry, dedicated logic, programmable logic, etc.), software (such as instructions run on a processing device), or a combination thereof. In one embodiment, method 1400 may be performed by clear mechanism 1110 of FIGS. 11-12. The processes of method 1400 are illustrated in linear sequences for brevity and clarity in presentation; however, it is contemplated that any number of them can be performed in parallel, asynchronously, or in different orders. For brevity, many of the details discussed with reference to the preceding FIGS. 1-13B may not be discussed or repeated hereafter.

Method 1400 begins at block 1405 with allocation and initialization of a first set of control bits associated with a framebuffer and, at block 1410, a first frame is rendered. At block 1415, a resolve operation is performed normally without any frame-to-frame coherence. At block 1420, a second set of control bits is allocated for a next frame and, at block 1425, the next frame is rendered. At block 1430, a frame-to-frame coherence, based on a combination of the two frames, is obtained such that a minimum set of resolve bits is deduced based on using the two sets of control bits frame-to-frame coherence. At block 1435, an expedited resolve operation is facilitated. Method 1400 may continue at block 1425 with the rendering of a next frame and an exchange of first and second sets of control bits.

Figure 14B:
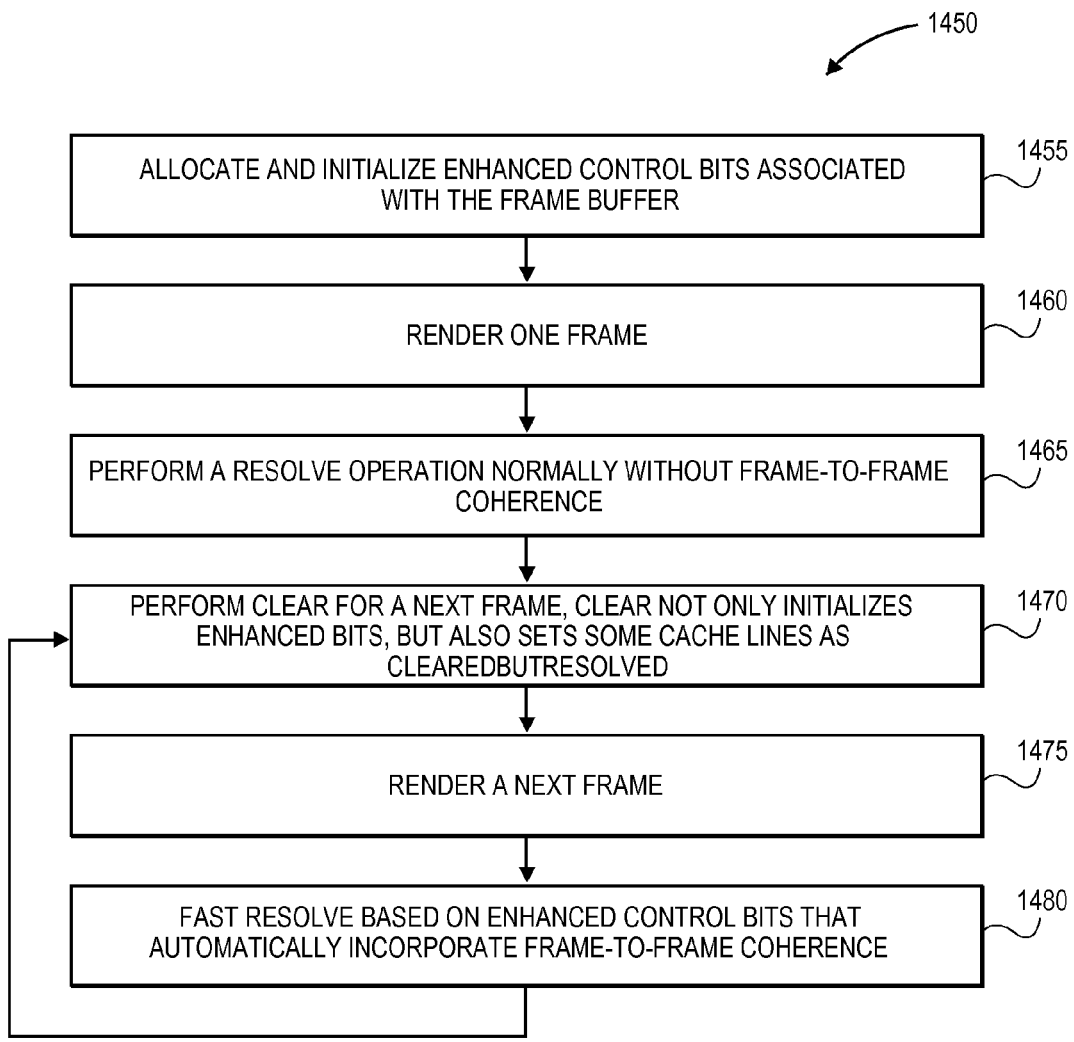
FIG. 14B illustrates a method for dynamically optimizing color buffer clear performance in graphics processing units according to one embodiment.

FIG. 14B illustrates a method 1450 for dynamically optimizing color buffer clear performance in GPUs according to one embodiment. Method 1450 may be performed by processing logic that may comprise hardware (e.g., circuitry, dedicated logic, programmable logic, etc.), software (such as instructions run on a processing device), or a combination thereof. In one embodiment, method 1450 may be performed by clear mechanism 1110 of FIGS. 11-12. The processes of method 1450 are illustrated in linear sequences for brevity and clarity in presentation; however, it is contemplated that any number of them can be performed in parallel, asynchronously, or in different orders. For brevity, many of the details discussed with reference to the preceding FIGS. 1-14A may not be discussed or repeated hereafter.

Method 1450 begins at block 1455 with allocation and initialization of enhanced control bits associated with a framebuffer and, at block 1460, a first frame is rendered. At block 1465, a resolve operation is performed normally without any frame-to-frame coherence. At block 1470, a clear operation for a next frame is performed, where the clear operation not only initializes the enhanced bits, but also sets some control bits as Cleared but Resolved. At block 1475, the next frame is rendered. At block 1480, a fast or expedited resolve operation is facilitated based on the enhanced control bits that automatically incorporate a frame-to-frame coherence based on a combination of the first and second frames. Method 1450 may continue at block 1470 with performing a clear operation for a next frame.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the foregoing specification, embodiments have been described with reference to specific exemplary embodiments thereof. It will, however, be evident that various modifications and changes may be made thereto without departing from the broader spirit and scope of embodiments as set forth in the appended claims. The Specification and drawings are, accordingly, to be regarded in an illustrative rather than a restrictive sense.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to dynamically optimize color buffer clear performance in graphics processing units on computing devices, comprising: allocation/initialization logic to allocate and initialize a first set of control bits associated with a framebuffer in a graphics processing unit (GPU); rendering logic to render a first frame, wherein the first set of control bits are associated with the first frame, wherein the allocation/initialization logic is further to allocate a second set of control bits associated with a second frame, wherein the rendering logic is further to render the second frame; and expedited resolve logic of resolve engine to facilitate an expedited resolve operation of the second frame based on a frame-to-frame coherence associated with the first and second frames.

Example 2 includes the subject matter of Example 1, further comprising normal resolve logic of the resolve engine to facilitate a normal resolve operation of the first frame without the frame-to-frame coherence.

Example 3 includes the subject matter of Example 1, further comprising frame-to-frame coherence logic to determine the frame-to-frame coherence, wherein determining includes deducing a minimum set of resolve bits based on the first and second set of control bits associated with the first and second frames.

Example 4 includes the subject matter of Example 1, wherein facilitating the expedited resolve process is further based on the minimum set of resolve bits.

Example 5 includes the subject matter of Example 1, wherein the allocation/initialization logic is further to allocate and initialize enhanced control bits associated with the framebuffer.

Example 6 includes the subject matter of Example 5, wherein the rendering logic is further to render the first frame, and wherein the normal resolve logic to facilitate a normal resolve process of the first frame without the frame-to-frame coherence.

Example 7 includes the subject matter of Example 5, further comprising clear logic to facilitate a clear operation to clear for the second frame, wherein the clear operation to initialize the enhanced control bits and set one or more control bits to a cleared but resolved state.

Example 8 includes the subject matter of Example 5, wherein the expedited resolve logic is further to facilitate a fast resolve operation of the second frame based on the enhanced control bits incorporating the frame-to-frame coherence.

Some embodiments pertain to Example 9 that includes a method for dynamically optimizing color buffer clear performance in graphics processing units on computing devices, comprising: allocating and initializing a first set of control bits associated with a framebuffer in a graphics processing unit (GPU), wherein allocating further includes allocating a second set of control bits associated with a second frame; rendering a first frame, wherein the first set of control bits are associated with the first frame, wherein rendering further includes rending the second frame; and facilitating an expedited resolve operation of the second frame based on a frame-to-frame coherence associated with the first and second frames.

Example 10 includes the subject matter of Example 9, further comprising facilitating a normal resolve operation of the first frame without the frame-to-frame coherence.

Example 11 includes the subject matter of Example 9, further comprising determining the frame-to-frame coherence, wherein determining includes deducing a minimum set of resolve bits based on the first and second set of control bits associated with the first and second frames.

Example 12 includes the subject matter of Example 9, wherein facilitating the expedited resolve process is further based on the minimum set of resolve bits.

Example 13 includes the subject matter of Example 9, wherein allocating and initializing further comprises allocating and initializing enhanced control bits associated with the framebuffer.

Example 14 includes the subject matter of Example 13, further comprising rendering the first frame; and facilitating a normal resolve process of the first frame without the frame-to-frame coherence.

Example 15 includes the subject matter of Example 13, further comprising facilitating a clear operation to clear for the second frame, wherein the clear operation to initialize the enhanced control bits and set one or more control bits to a cleared but resolved state.

Example 16 includes the subject matter of Example 13, further comprising facilitating a fast resolve operation of the second frame based on the enhanced control bits incorporating the frame-to-frame coherence.

Example 17 includes at least one machine-readable medium comprising a plurality of instructions, when executed on a computing device, to implement or perform a method or realize an apparatus as claimed in any preceding claims.

Example 18 includes at least one non-transitory or tangible machine-readable medium comprising a plurality of instructions, when executed on a computing device, to implement or perform a method or realize an apparatus as claimed in any preceding claims.

Example 19 includes a system comprising a mechanism to implement or perform a method or realize an apparatus as claimed in any preceding claims.

Example 20 includes an apparatus comprising means to perform a method as claimed in any preceding claims.

Example 21 includes a computing device arranged to implement or perform a method or realize an apparatus as claimed in any preceding claims.

Example 22 includes a communications device arranged to implement or perform a method or realize an apparatus as claimed in any preceding claims.

Some embodiments pertain to Example 23 includes a system comprising a storage device having instructions, and a processor to execute the instructions to facilitate a mechanism to perform one or more operations comprising: allocating and initializing a first set of control bits associated with a framebuffer in a graphics processing unit (GPU), wherein allocating further includes allocating a second set of control bits associated with a second frame; rendering a first frame, wherein the first set of control bits are associated with the first frame, wherein rendering further includes rending the second frame; and facilitating an expedited resolve operation of the second frame based on a frame-to-frame coherence associated with the first and second frames.

Example 24 includes the subject matter of Example 23, wherein the one or more operations further comprise facilitating a normal resolve operation of the first frame without the frame-to-frame coherence.

Example 25 includes the subject matter of Example 23, wherein the one or more operations further comprise determining the frame-to-frame coherence, wherein determining includes deducing a minimum set of resolve bits based on the first and second set of control bits associated with the first and second frames.

Example 26 includes the subject matter of Example 23, wherein facilitating the expedited resolve process is further based on the minimum set of resolve bits.

Example 27 includes the subject matter of Example 23, wherein allocating and initializing further comprises allocating and initializing enhanced control bits associated with the framebuffer.

Example 28 includes the subject matter of Example 27, wherein the one or more operations further comprise rendering the first frame; and facilitating a normal resolve process of the first frame without the frame-to-frame coherence.

Example 29 includes the subject matter of Example 27, wherein the one or more operations further comprise facilitating a clear operation to clear for the second frame, wherein the clear operation to initialize the enhanced control bits and set one or more control bits to a cleared but resolved state.

Example 30 includes the subject matter of Example 27, wherein the one or more operations further comprise facilitating a fast resolve operation of the second frame based on the enhanced control bits incorporating the frame-to-frame coherence.

Some embodiments pertain to Example 31 includes an apparatus comprising: means for allocating and initializing a first set of control bits associated with a framebuffer in a graphics processing unit (GPU), wherein allocating further includes allocating a second set of control bits associated with a second frame; means for rendering a first frame, wherein the first set of control bits are associated with the first frame, wherein rendering further includes rending the second frame; and means for facilitating an expedited resolve operation of the second frame based on a frame-to-frame coherence associated with the first and second frames.

Example 32 includes the subject matter of Example 31, further comprising means for facilitating a normal resolve operation of the first frame without the frame-to-frame coherence.

Example 33 includes the subject matter of Example 31, further comprising means for determining the frame-to-frame coherence, wherein determining includes deducing a minimum set of resolve bits based on the first and second set of control bits associated with the first and second frames.

Example 34 includes the subject matter of Example 31, wherein the means for facilitating the expedited resolve process is further based on the minimum set of resolve bits.

Example 35 includes the subject matter of Example 31, wherein the means for allocating and initializing further comprises means for allocating and initializing enhanced control bits associated with the framebuffer.

Example 36 includes the subject matter of Example 35, further comprising means for rendering the first frame; and means for facilitating a normal resolve process of the first frame without the frame-to-frame coherence.

Example 37 includes the subject matter of Example 35, further comprising means for facilitating a clear operation to clear for the second frame, wherein the clear operation to initialize the enhanced control bits and set one or more control bits to a cleared but resolved state.

Example 38 includes the subject matter of Example 35, further comprising means for facilitating a fast resolve operation of the second frame based on the enhanced control bits incorporating the frame-to-frame coherence.

Example 39 includes the subject matter of Example 1, wherein the first set of control bits is associated with a set of cache lines, wherein the set of cache lines include at least one of cleared, rendered, and cleared but rendered, wherein a resolve operation is not necessitated when cleared but rendered is executed, wherein the set of cache lines refer to hardware added for the resolve operation when the framebuffer is first cleared.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:
1. An apparatus comprising:
 allocation/initialization logic to allocate and initialize a first set of control bits associated with a framebuffer in a graphics processing unit (GPU);
 rendering logic to render a first frame, wherein the first set of control bits is associated with the first frame, wherein the allocation/initialization logic is further to allocate a second set of control bits associated with a second frame,
wherein the rendering logic is further to render the second frame; and
expedited resolve logic to facilitate an expedited resolve operation of the second frame based on a frame-to-frame coherence associated with the first and second frames,
wherein the first set of control bits is further associated with a set of cache lines, wherein the set of cache lines indicate at least one of cleared, rendered, and cleared-but-resolved, wherein a resolve operation is not necessitated when a cleared-but-resolved state is executed, wherein the set of cache lines refers to hardware added for the resolve operation when the framebuffer is first cleared.

2. The apparatus of claim 1, further comprising normal resolve logic to facilitate a normal resolve operation of the first frame without the frame-to-frame coherence.

3. The apparatus of claim 1, further comprising frame-to-frame coherence logic to determine the frame-to-frame coherence, wherein determining includes deducing a minimum set of resolve bits based on the first and second set of control bits associated with the first and second frames.

4. The apparatus of claim 1, wherein facilitating the expedited resolve process is further based on the minimum set of resolve bits.

5. The apparatus of claim 1, wherein the allocation/initialization logic is further to allocate and initialize enhanced control bits associated with the framebuffer.

6. The apparatus of claim 5, wherein the rendering logic is further to render the first frame, and
wherein the normal resolve logic to facilitate a normal resolve process of the first frame without the frame-to-frame coherence.

7. The apparatus of claim 5, further comprising clear logic to facilitate a clear operation to clear for the second frame, wherein the clear operation to initialize the enhanced control bits and set one or more control bits to the cleared-but-resolved state.

8. The apparatus of claim 5, wherein the expedited resolve logic is further to facilitate a fast resolve operation of the second frame based on the enhanced control bits incorporating the frame-to-frame coherence.

9. A method comprising:
allocating and initializing a first set of control bits associated with a framebuffer in a graphics processing unit (GPU), wherein allocating further includes allocating a second set of control bits associated with a second frame;
rendering a first frame, wherein the first set of control bits are associated with the first frame, wherein rendering further includes rending the second frame; and
facilitating an expedited resolve operation of the second frame based on a frame-to-frame coherence associated with the first and second frames,
wherein the first set of control bits is further associated with a set of cache lines, wherein the set of cache lines indicate at least one of cleared, rendered, and cleared-but-resolved, wherein a resolve operation is not necessitated when a cleared-but-resolved state is executed, wherein the set of cache lines refers to hardware added for the resolve operation when the framebuffer is first cleared.

10. The method of claim 9, further comprising facilitating a normal resolve operation of the first frame without the frame-to-frame coherence.

11. The method of claim 9, further comprising determining the frame-to-frame coherence, wherein determining includes deducing a minimum set of resolve bits based on the first and second set of control bits associated with the first and second frames.

12. The method of claim 9, wherein facilitating the expedited resolve process is further based on the minimum set of resolve bits.

13. The method of claim 9, wherein allocating and initializing further comprises allocating and initializing enhanced control bits associated with the framebuffer.

14. The method of claim 13, further comprising:
rendering the first frame, and
facilitating a normal resolve process of the first frame without the frame-to-frame coherence.

15. The method of claim 13, further comprising facilitating a clear operation to clear for the second frame, wherein the clear operation to initialize the enhanced control bits and set one or more control bits to the cleared-but-resolved state.

16. The method of claim 13, further comprising facilitating a fast resolve operation of the second frame based on the enhanced control bits incorporating the frame-to-frame coherence.

17. At least one non-transitory machine-readable medium comprising a plurality of instructions, executed on a computing device, to facilitate the computing device to perform one or more operations comprising:
allocating and initializing a first set of control bits associated with a framebuffer in a graphics processing unit (GPU), wherein allocating further includes allocating a second set of control bits associated with a second frame;
rendering a first frame, wherein the first set of control bits are associated with the first frame, wherein rendering further includes rending the second frame; and
facilitating an expedited resolve operation of the second frame based on a frame-to-frame coherence associated with the first and second frames,
wherein the first set of control bits is further associated with a set of cache lines, wherein the set of cache lines indicate at least one of cleared, rendered, and cleared-but-resolved, wherein a resolve operation is not necessitated when a cleared-but-resolved state is executed, wherein the set of cache lines refers to hardware added for the resolve operation when the framebuffer is first cleared.

18. The non-transitory machine-readable medium of claim 17, wherein the one or more operations comprise facilitating a normal resolve operation of the first frame without the frame-to-frame coherence.

19. The non-transitory machine-readable medium of claim 17, wherein the one or more operations comprise determining the frame-to-frame coherence, wherein determining includes deducing a minimum set of resolve bits based on the first and second set of control bits associated with the first and second frames.

20. The non-transitory machine-readable medium of claim 17, wherein facilitating the expedited resolve process is further based on the minimum set of resolve bits.

21. The non-transitory machine-readable medium of claim 17, wherein allocating and initializing further comprises allocating and initializing enhanced control bits associated with the framebuffer.

22. The non-transitory machine-readable medium of claim 21, wherein the one or more operations comprise:
   rendering the first frame, and
   facilitating a normal resolve process of the first frame without the frame-to-frame coherence.

23. The non-transitory machine-readable medium of claim 21, herein the one or more operations comprise facilitating a clear operation to clear for the second frame, wherein the clear operation to initialize the enhanced control bits and set one or more control bits to the cleared-but-resolved state.

24. The non-transitory machine-readable medium of claim 21, herein the one or more operations comprise facilitating a fast resolve operation of the second frame based on the enhanced control bits incorporating the frame-to-frame coherence.

* * * * *